(12) United States Patent
Kariya et al.

(10) Patent No.: US 8,678,544 B2
(45) Date of Patent: Mar. 25, 2014

(54) INK SET AND IMAGE RECORDING METHOD

(75) Inventors: Toshihiro Kariya, Kanagawa (JP); Terukazu Yanagi, Kanagawa (JP); Yoshimitsu Arai, Kanagawa (JP); Akio Tamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 462 days.

(21) Appl. No.: 12/697,644

(22) Filed: Feb. 1, 2010

(65) Prior Publication Data

US 2010/0203247 A1    Aug. 12, 2010

(30) Foreign Application Priority Data

Feb. 12, 2009    (JP) .................. 2009-029972

(51) Int. Cl.
 *B41J 2/165* (2006.01)
 *C09D 11/10* (2006.01)
(52) U.S. Cl.
 USPC ................. 347/28; 347/21; 523/160
(58) Field of Classification Search
 USPC ...................... 523/160; 347/21, 28
 See application file for complete search history.

(56) References Cited

U.S. PATENT DOCUMENTS

| | | | |
|---|---|---|---|
| 6,114,411 A | 9/2000 | Nakamura et al. | |
| 8,038,254 B2 * | 10/2011 | Arai et al. | 347/28 |
| 2008/0238984 A1 | 10/2008 | Yahiro | |

FOREIGN PATENT DOCUMENTS

| | | |
|---|---|---|
| JP | 7-32721 A | 2/1995 |
| JP | 7-34017 A | 2/1995 |
| JP | 8-283636 A | 10/1996 |
| JP | 9-207424 A | 8/1997 |
| JP | 9-208870 A | 8/1997 |
| JP | 10-110126 A | 4/1998 |
| JP | 10-152640 A | 6/1998 |
| JP | 11-263022 A | 9/1999 |
| JP | 2005-146224 A | 6/2005 |
| JP | 2007-119658 A | 5/2007 |
| JP | 2008-246786 A | 10/2008 |

OTHER PUBLICATIONS

Oh et al. Progress in Organic Coatings, 72, 2011, 253-259.*
Office Action for Japanese Application No. 2009-029972, dated Jun. 18, 2013, including a partial English translation.

* cited by examiner

*Primary Examiner* — Vu A Nguyen
(74) *Attorney, Agent, or Firm* — Birch, Stewart, Kolasch & Birch, LLP

(57) ABSTRACT

There is provided an ink set including an aqueous ink composition and a maintenance liquid. The aqueous ink composition includes water; a pigment; resin particles having a minimum film-forming temperature $MFT^0$, which is a minimum film-forming temperature obtained when the resin particles are dispersed in water, of 60° C. or higher; and a water-soluble organic solvent, wherein a minimum film-forming temperature $MFT^{25}$ of the resin particles, which is a minimum film-forming temperature obtained when the resin particles are mixed with the water-soluble organic solvent in an amount of 25% by mass relative to the solid content of the resin particles, and water, is at least 40° C. lower than $MFT^0$. The maintenance liquid includes an organic solvent and water. There is also provided an image recording method.

11 Claims, No Drawings

INK SET AND IMAGE RECORDING METHOD

CROSS-REFERENCE TO RELATED APPLICATION

This application claims priority under 35 USC 119 from Japanese Patent Application No. 2009-29972 filed on Feb. 12, 2009, the disclosure of which is incorporated by reference herein.

BACKGROUND OF THE INVENTION

1. Field of the Invention

The present invention relates to an ink set and an image recording method suitable for image recording in which ink is ejected by an ink-jet method.

2. Description of the Related Art

With the rapid development of the information technology industry in recent years, various information processing systems have been developed and recording methods and recording devices suitable for the respective information processing systems have been put into practical use. In particular, ink-jet recording methods have been widely used because they are advantageous in that they allow recording on various recording materials, the hardware (apparatus) thereof is relatively inexpensive and compact, and they allow very quiet operation, and the like. By recording using ink-jet recording methods, it has become possible to obtain high quality, photograph-like recorded materials.

Ink jet recording methods using pigment inks containing pigments as color materials are generally considered to have excellent storability compared with ink-jet recording methods using dye inks.

When the moisture in the pigment ink evaporates and the pigment ink solidifies, the solidified ink does not re-dissolve. Therefore, the ink is likely to adhere to and form a deposit on a nozzle tip of an ink-jet head or the like, which causes ink clogging at the time of ejection, resulting in poor ink ejection. When the ink solidifies at a cap, a wiper, or the like, wiping or the like thereof is difficult, which increases the burden of a maintenance system.

As a method for obtaining images using the pigment inks, a method has been proposed in which printing is performed by ejecting ink droplets of inks containing a thermoplastic resin component to a recording medium heated to a temperature higher than the softening point of the thermoplastic resin, thereby obtaining images with no bluffing (see, for example, Japanese Patent Application Laid-Open (JP-A) Nos. 8-283636, 10-110126, and 10-152640). Moreover, an ink-jet recording method including forming an ink image using an ink containing a resin emulsion having a minimum film-forming temperature of 50° C. or more on a transfer medium whose surface temperature is heated to be higher than the minimum film-forming temperature of the resin emulsion, evaporating solvent components of the ink image on the transfer medium, and transferring the ink image on the transfer medium to a recording medium has been disclosed (see, for example, JP-A Nos. 9-207424 and 7-32721).

In the system in which a pigment ink including a thermoplastic resin component or a resin emulsion having a high minimum film-forming temperature is used, the maintenance performance may tend to further deteriorate.

In order to address the above, a maintenance liquid for ink-jet recording containing a resin solvent having a solubility in water at 25° C. of 3% by weight or more in an amount of from 0.1% by weight to 10% by weight and a humectant in an amount of from 1% by weight to 50% by weight has been disclosed (see, for example, JP-A No. 2007-119658).

SUMMARY OF THE INVENTION

In order to increase the scratch resistance of images, it is desirable to include a resin component in a pigment ink. However, with the maintenance liquid for ink-jet recording described above, sufficient cleaning effects are not necessarily achieved.

The present invention has been made in view of the above circumstances, and provides an ink set and an image recording method.

It has been found that adhesion of image portions (blocking properties) may be suppressed and scratch resistance may also be achieved, while also conserving heat energy, when employing a method in which the minimum film-forming temperature (hereinafter sometimes referred to as MFT (Minimum Film-forming Temperature)) of resin particles in an ink is maintained at a low level during a stage of image recording, and in which the MFT of polymer particles increases over time, or by application of heat at the time of drying or the like after recording. It has also been found when the MFT is in a specific range, cleanability by a mixed liquid containing an organic solvent and water when a pigment ink containing a pigment and a resin component adheres and solidifies, is improved. The present invention has been achieved based on these findings.

According to a first aspect of the present invention, there is provided an ink set including an aqueous ink composition and a maintenance liquid. The aqueous ink composition includes a pigment; resin particles, a minimum film forming temperature $MFT^0$ of the water dispersion of which is 60° C. or higher; a water-soluble organic solvent, wherein a minimum film forming temperature $MFT^{25}$ of a mixture liquid obtained by mixing the resin particles, the water-soluble organic solvent in an amount of 25% by mass relative to the solid content of the resin particles, and water, is at least 40° C. lower than the $MFT^0$ of the water dispersion of the resin particles; and water. The maintenance liquid includes an organic solvent and water.

According to a second aspect of the present invention, there is provided an image recording method including recording an image using the ink set of the first aspect of the invention.

DETAILED DESCRIPTION OF THE INVENTION

The ink set of the present invention and the image recording method of the invention in which the ink set is used are described in detail below.

Ink Set

The ink set of the present invention includes (a) an aqueous ink composition and (b) a maintenance liquid. The aqueous ink composition includes water; a pigment; resin particles having a minimum film forming temperature $MFT^0$, which is a minimum film-forming temperature obtained when the resin particles are dispersed in water, of 60° C. or higher; and a water-soluble organic solvent, wherein a minimum film forming temperature $MFT^{25}$ of the resin particles, which is a minimum film-forming temperature obtained when the resin particles are mixed with the water-soluble organic solvent in an amount of 25% by mass relative to the solid content of the resin particles, and water, is at least 40° C. lower than $MFT^0$ of the water dispersion of the resin particles. The maintenance liquid includes an organic solvent and water.

In the present invention, resin particles are used in a pigment ink composition for recording an image. Further, a minimum film forming temperature $MFT^0$ of the resin particles, which is a minimum film-forming temperature obtained when the resin particles are dispersed in water, is 60° C. or higher; a water-soluble organic solvent is contained in the ink composition; and a minimum film forming temperature $MFT^{25}$ of the resin particles, which is a minimum film-forming temperature obtained when the resin particles are mixed in a mixture liquid obtained by mixing the resin particles, the water-soluble organic solvent in an amount of 25% by mass relative to the solid content of the resin particles, and water, is at least 40° C. lower than $MFT^0$. Accordingly, it is possible to suppress blocking of an image portion and obtain scratch resistance. In maintenance operations, it is also possible to dramatically enhance cleanability of an ink composition adhered to and solidified at, for example, a nozzle surface of the ink jet head nozzle. Accordingly, when an image is recorded using an ink composition containing a pigment and a resin component, it is also possible to stably perform recording of a high-quality image that has excellent scratch resistance, over an extended time period, while suppressing the occurrence of blocking.

The $MFT^0$ and the $MFT^{25}$ are described below.

The "$MFT^0$" is a minimum film-forming temperature of a water dispersion of the resin particles that are used in the aqueous ink composition. The $MFT^0$ is measured using a MFT meter manufactured by YOSHIMITU SEIKI K.K. Specifically, the $MFT^0$ is determined by a process that includes coating a liquid obtained by dispersing the desired resin particles in water and adjusting the concentration of the water dispersion to 25% by mass, onto a film (for example, 64 cm×18 cm) with a blade so as to form a 300 μm-thick coating (for example, 50 cm length×3 cm width), heating the coating from the back side of the film to apply a temperature gradient of from 12° C. to 65° C. to the coating, and drying the coating for 4 hours under an environment at 20° C. and 22% RH, while measuring the boundary temperature (° C.) between the temperature where a white powder precipitate is produced and the temperature where a transparent film is formed.

The "$MFT^{25}$" is a minimum film-forming temperature of a mixture liquid obtained by mixing the resin particles, the water-soluble organic solvent in an amount of 25% by mass relative to the solid content of the resin particles, and water. The $MFT^{25}$ is measured using a similar process to that used for measuring the $MFT^0$, except that a mixture (aqueous solution) of 25% by mass (solid mass) of the resin particles, 6.25% by mass of the water-soluble organic solvent (25% by mass based on the solid content of the polymer), which is used to form the ink composition, and 68.75% by mass of water is prepared and used in place of the water dispersion. If the $MFT^{25}$ exceeds the upper limit of the meter, any of $MFT^{30}$ to $MFT^{50}$, the value obtained when the content of the water-soluble organic solvent is 30 to 50% by mass relative to the solid content of the resin particles, may be appropriately measured, and then the $MFT^{25}$ may be estimated from the value(s).

(a) Aqueous Ink Composition

The aqueous ink composition included in the ink set of the invention includes: a pigment; resin particles, a minimum film-forming temperature $MFT^0$ of the water dispersion of which is 60° C. or higher; a water-soluble organic solvent, wherein a minimum film-forming temperature $MFT^{25}$ of a mixture liquid obtained by mixing the resin particles, the water-soluble organic solvent in an amount of 25% by mass relative to the solid content of the resin particles, and water, is at least 40° C. lower than the $MFT^0$ of the water dispersion of the resin particles; and water. The aqueous ink composition may further include any one or more of a dispersant, a surfactant, and other components, as necessary.

In the ink composition of the present invention, as a resin component in a form of particles, resin particles in which the MFT of the water dispersion and the MFT of an aqueous solution containing a water-soluble organic solvent satisfies the relationship of $MFT^0-MFT^{25} \geq 40°$ C., is used. Therefore, in the ink composition containing a water-soluble organic solvent, the minimum film-forming temperature (MFT) of the resin particles is maintained at a relatively low temperature, while, after the ink is applied to a recording medium by ejection, since the organic solvent is removed from the ink by elapse of time, drying and the like, for example, by absorption of ink solvent into the recording medium, the MFT of the resin rises. Accordingly, it is possible to obtain an image with suppressed occurrence of blocking, while using resin particles having relatively a low MFT and a relatively low glass transition temperature (Tg), thereby assuring a fixing properties such as scratch resistance with a low temperature energy.

Pigment

The ink composition of the invention includes at least one pigment. Preferable examples of the pigment include a water-insoluble pigment itself and a pigment surface-treated with a dispersant.

The pigment may be of any type, and any of conventional organic pigments and conventional inorganic pigments may be used. Examples of the pigments include organic pigments such as azo lakes, azo pigments, polycyclic pigments such as phthalocyanine pigments, perylene and perinone pigments, anthraquinone pigments, quinacridone pigments, dioxazine pigments, diketopyrrolopyrrole pigments, thioindigo pigments, isoindolinone pigments, and quinophthalone pigments, dye lakes such as basic dye lakes and acidic dye lakes, nitro pigments, nitroso pigments, aniline black, and daylight fluorescent pigments; and inorganic pigments such as titanium oxide, iron oxide pigments, and carbon black pigments. Any pigment capable of being dispersed in an aqueous phase may also be used, even though not listed in the Color Index. As a matter of course, a product produced by surface-treating the pigment with a surfactant, a polymer dispersant or the like, or graft carbon or the like may also be used.

Among the pigments, preferable examples of the pigment include, azo pigments, phthalocyanine pigments, anthraquinone pigments, quinacridone pigments, and carbon black pigments.

—Dispersant—

The pigment is preferably dispersed with a dispersant in an aqueous solvent. The dispersant may be a polymer dispersant or a low-molecular-weight, surface-active dispersant. The polymer dispersant may be any of a water-soluble dispersant and a water-insoluble dispersant.

The low-molecular-weight, surface-active dispersant (hereinafter also referred to as "low-molecular-weight dispersant") may be added for the purpose of stably dispersing the organic pigment in the aqueous solvent while keeping the viscosity of the ink low. As used herein, the term "low-molecular-weight dispersant" refers to a dispersant with a molecular weight of 2,000 or less. The molecular weight of the low-molecular-weight dispersant is preferably from 100 to 2,000, and more preferably from 200 to 2,000.

The low molecular-weight dispersant has a structure containing a hydrophilic group and a hydrophobic group. At least one of each of the hydrophilic group and the hydrophobic group may be independently contained in one molecule, and the low molecular-weight dispersant may have plural hydrophilic groups and plural hydrophobic groups. The low molecular-weight dispersant can appropriately have a linking group for linking the hydrophilic group and the hydrophobic group.

The hydrophilic group may be, for example, an anionic group, a cationic group, a nonionic group, or a betaine type group having a combination thereof. The anionic group may be any group having negative charge, and the anionic group is preferably a phosphoric acid group, a phosphonic acid group, a phosphinic acid group, a sulfuric acid group, a sulfonic acid group, a sulfinic acid group, or a carboxyl group, more preferably a phosphoric acid group or a carboxyl group, and further preferably a carboxyl group. The cationic group may be any group having positive charge, and the cationic group is preferably an organic cationic substituent, more preferably a nitrogen- or phosphorus-containing cationic group, and further preferably a nitrogen-containing cationic group. In particular, the cationic group is preferably a pyridinium cation or an ammonium cation. The nonionic group may be of any type, as long as it has neither negative nor positive charge. For example, it may be part of polyalkylene oxide, polyglycerin or any sugar unit, or the like.

The hydrophilic group is preferably an anionic group from the standpoints of dispersion stability and aggregation of a pigment.

When the low molecular-weight dispersant has an anionic hydrophilic group, its pKa is preferably 3 or more from the standpoint of accelerating an aggregation reaction when contacted with an acidic treatment liquid. The pKa of the low molecular-weight dispersant herein is a value experimentally obtained from a titration curve by titrating a liquid obtained dissolving 1 mmol/L of a low molecular-weight dispersant in a tetrahydrofuran-water=3:2 (V/V) solution, with an acid or alkali aqueous solution. Theoretically, when pKa of a low molecular-weight dispersant is 3 or more, 50% or more of anionic groups are in a non-dissociation state when contacted with a treatment liquid having a pH of about 3. Therefore, water solubility of the low molecular-weight dispersant is remarkably decreased, and an aggregation reaction occurs. In other words, aggregation reactivity is improved. From this standpoint, it is preferred that the low molecular-weight dispersant has a carboxyl group as an anionic group.

The hydrophobic group may have any of a hydrocarbon structure, a fluorocarbon structure, a silicone structure, and so on. In particular, the hydrophobic group preferably has a hydrocarbon structure. The hydrophobic group may be any of a straight chain structure and a branched chain structure. The hydrophobic group may form a single chain structure or a two or more chain structure. When a two or more chain structure is formed, the dispersant may have plural kinds of hydrophobic groups. The hydrophobic group is preferably a hydrocarbon group of 2 to 24 carbon atoms, more preferably a hydrocarbon group of 4 to 24 carbon atoms, and further preferably a hydrocarbon group of 6 to 20 carbon atoms.

Of the polymer dispersants, a hydrophilic polymer may be used as the water-soluble dispersant. Examples of a natural hydrophilic polymer include vegetable polymers such as gum Arabic, gum tragacanth, gum guar, gum karaya, locust bean gum, arabinogalactan, pectin and quince seed starch; seaweed polymers such as alginic acid, carrageenan and agar; animal polymers such as gelatin, casein, albumin and collagen; and microbial polymers such as xanthene gum and dextran.

Examples of a chemically modified hydrophilic polymer using a natural product as a raw material include cellulose polymers such as methyl cellulose, ethyl cellulose, hydroxyethyl cellulose, hydroxypropyl cellulose and carboxymethyl cellulose; starch polymers such as sodium starch glycolate and sodium starch phosphate; and seaweed polymers such as propylene glycol alginate.

Examples of a synthetic water-soluble polymer include vinyl polymers such as polyvinyl alcohol, polyvinyl pyrrolidone and polyvinyl methyl ether; acrylic resins such as polyacrylamide, polyacrylic acid or an alkali metal salt thereof, and water-soluble styrene acrylic resin; water-soluble styrene maleic acid resins; water-soluble vinylnaphthalene acrylic resins; water-soluble vinylnaphthalene maleic resins; polyvinyl pyrrolidone, alkali metal salts of β-naphthalenesulfonic acid formalin condensate; and polymer compounds having a salt of a cationic functional group such as quaternary ammonium or amino group at a side chain thereof.

Among these, a polymer compound containing a carboxyl group is preferred from the standpoints of properties of dispersion stability and aggregation properties of pigment. Preferable examples of the polymer compound containing a carboxyl group include acrylic resins such as a water-soluble styrene acrylic resin; a water-soluble styrene maleic acid resin; a water-soluble vinylnaphthalene acrylic resin; and a water-soluble vinylnaphthalene maleic acid resin.

Among the polymer dispersants, as a water-insoluble dispersant, a polymer having both a hydrophilic moiety and a hydrophobic moiety may be used. Examples of such a polymer include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer and a styrene-maleic acid copolymer.

The polymer dispersant preferably has a weight average molecular weight of from 3,000 to 200,000, more preferably from 5,000 to 100,000, further preferably from 5,000 to 80,000, and particularly preferably from 10,000 to 60,000.

The mass ratio of a pigment to a dispersant (pigment: dispersant) is preferably in a range of from 1:0.06 to 1:3, more preferably in a range of from 1:0.125 to 1:2, and further preferably in a range of from 1:0.125 to 1:1.5.

In the invention, the pigment preferably contains a pigment and a dispersant, more preferably an organic pigment and a polymer dispersant, and further preferably an organic pigment and a polymer dispersant having a carboxyl group, from the viewpoints of scratch resistance and aggregation property. From the viewpoint of aggregation property, the pigment is preferably a water-insoluble pigment that is coated with a polymer dispersant having a carboxyl group.

Further, the self-dispersing polymer particles described below preferably have an acid value lower than the acid value of the polymer dispersant, from the viewpoint of aggregation property.

The pigment has a volume average particle size of preferably from 10 nm to 200 nm, more preferably from 10 nm to 150 nm, and further preferably from 10 nm to 100 nm When the volume average particle size is 200 nm or less, color reproducibility may become better, and in the case of an inkjet method, droplet ejection properties may become better. Furthermore, when the average particle size is 10 nm or more, light resistance may become better. The particle size distribution of the pigment is not particularly limited, and may be any of wide particle size distribution and monodisperse particle size distribution. A mixture of two or more kinds of pigments having monodisperse particle size distribution may be used.

The volume average particle size and the particle size distribution of the resin particles can be determined by measuring the volume average particle size by means of a dynamic light scattering method using a particle size distribution measuring apparatus NANOTRACK UPA-EX150 (trade name, available from Nikkiso Co. Ltd.).

Only one pigment may be used, or two or more pigments may be used in combination. From the viewpoint of image density, the content of the pigment in the aqueous ink composition is preferably from 1% by mass to 25% by mass, more preferably from 2% by mass to 20% by mass, further preferably from 5% by mass to 20% by mass, particularly preferably from 5% by mass to 15% by mass.

Resin Particles

The aqueous ink composition of the invention contains at least one kind of resin particles, and a minimum film-forming temperature) ($MFT^0$ of a water dispersion of the resin particles is 60° C. or higher. When the resin particles as described above are included in the aqueous ink composition, scratch resistance of the pigment image may be improved while occurrence of blocking may be suppressed. Since the resin particles satisfy $MFT^0$-$MFT^{25}$≥40° C. with respect to the relationship with the water-soluble organic solvent which is described below, stable ejection performance may be obtained and blocking (for example, sticking) of the recorded image may be suppressed.

When the $MFT^0$ of the resin particles is less than 60° C., the recorded image may have stickiness, so that blocking (sticking, etc.) may occur when a sheet of paper or the like is placed on the image portion. In the invention, the $MFT^0$ is preferably from 80° C. to 150° C., and more preferably from 100 to 130° C. When the MFT is less than 130° C., thermal fixation can be achieved with a relatively small amount of heat, which is preferred in order to reduce the power requirements of the fixation.

Examples of the resin particles in the invention include particles of a resin having an anionic group. Examples of the resin having an anionic group include thermoplastic, thermosetting, or modified acrylic, epoxy, polyurethane, polyether, polyamide, unsaturated polyester, phenolic, silicone, and fluoro resins, polyvinyl type resins such as vinyl chloride, vinyl acetate, polyvinyl alcohol, and polyvinyl butyral resins, polyester resins such as alkyd resins and phthalic acid resins, amino type materials such as melamine resins, melamine formaldenyde resins, amino alkyd condensate resins, urea resin, and copolymers or mixtures thereof. Among them, the anionic acrylic resin may be obtained, for example, by polymerizing an acrylic monomer having an anionic group (anionic group-containing acrylic monomer) and, optionally, a monomer(s) copolymerizable with the anionic group-containing acrylic monomer in a solvent. Examples of the anionic group-containing acrylic monomer include acrylic monomers having at least one selected from the group consisting of a carboxyl group, a sulfonic acid group, and a phosphonic group. Among them, acrylic monomers having a carboxyl group (for example, acrylic acid, methacrylic acid, crotonic acid, ethacrylic acid, propyl acrylic acid, isopropyl acrylic acid, itaconic acid, and fumaric acid, etc.) are preferred, and acrylic acid or methacrylic acid is particularly preferred.

As the resin particles in the invention, self-dispersing resin particles are preferred and self-dispersing resin particles having a carboxyl group is more preferred, from the viewpoint of the ejection stability and the liquid stability (particularly, dispersion stability) in a case of using a pigment. The self-dispersing resin particles mean particles of a water-insoluble polymer which can form a dispersion state in an aqueous medium by means of a functional group (particularly, an acidic group or a salt thereof) of the polymer per se in the absence of other surfactant, and are water-insoluble polymer particles which do not contain an additional emulsifier.

The dispersed state may be an emulsified state where the water-insoluble polymer is dispersed in a liquid state in an aqueous medium (emulsion) or a state where the water-insoluble polymer is dispersed in a solid state in the aqueous medium (suspension).

The water-insoluble polymer in the invention is preferably such a water-insoluble polymer that can form a dispersed state where the water-insoluble polymer is dispersed in a solid state, from the viewpoints of the aggregation speed and the fixing property when it is used for a liquid composition.

The dispersed state of the self-dispersing resin particles in the invention means such a state where stable presence of a dispersed state can be observed visually at 25° C. for at least one week after mixing and stiffing a solution in which 30 g of a water-insoluble polymer is dissolved into 70 g of an organic solvent (for example, methyl ethyl ketone), a neutralizing agent capable of neutralizing salt-forming groups of the water-insoluble polymer to 100% (sodium hydroxide when the salt-forming groups are anionic, or acetic acid when the groups are cationic), and 200 g of water (apparatus: a stirrer equipped with a stirring blade, number of rotation: 200 rpm, 30 min, 25° C.), and then removing the organic solvent from the liquid mixture.

The water-insoluble polymer means such a polymer showing an amount of dissolution of 10 g or less when the polymer is dried at 105° C. for 2 hr and then dissolved in 100 g of water at 25° C. The amount of dissolution is, preferably, 5 g or less and, more preferably, 1 g or less. The amount of dissolution is the amount of dissolution when the polymer is neutralized with sodium hydroxide or acetic acid to 100% in accordance with the kind of the salt-forming group of the water-insoluble polymer.

The aqueous medium includes water and, if necessary, may include a water-soluble organic solvent. In the invention, the aqueous medium is preferably composed of water and 0.2% by mass or less of a water-soluble organic solvent based on the amount of water, more preferably consists of water.

The main chain skeleton of the water-insoluble polymer is not particularly limited and, for example, vinyl polymer or condensated type polymer (epoxy resin, polyester, polyurethane, polyamide, cellulose, polyether, polyurea, polyimide, polycarbonate, etc.) can be used. Among them, the vinyl polymer is preferred.

Preferred examples of the vinyl polymer and the monomer used for the vinyl polymer include those described in JP-A Nos. 2001-181549 and 2002-88294. Further, vinyl polymers introduced with a dissociative group to a terminal end of a polymer chain by radical polymerization of a vinyl monomer using a chain transfer agent, a polymerization initiator, or an iniferter having a dissociative group (or substituent that can be induced to the dissociative group) or by ionic polymerization using a compound having a dissociative group (or substituent that can be induced to the dissociative group) to an initiator or a terminator can also be used. Preferred examples of condensated type polymers and monomers used for the condensated type polymers include those described in JP-A No. 2001-247787.

The self-dispersing resin particles in the invention preferably contain a water-insoluble polymer containing a hydrophilic constituent unit and a constituent unit derived from an aromatic group-containing monomer or derived from an alicyclic (meth)acrylate, from the viewpoint of self-dispersibility. When the self-dispersing resin particles contain a structure derived from an alicyclic (meth)acrylate, an ink that has better image fixing property and blocking resistance may be obtained. Further, when the ink is used for ink-jet recording, better ejection property may be obtained.

The hydrophilic constituent unit is not particularly limited as long as it is derived from a hydrophilic group-containing monomer. The hydrophilic constituent unit may be derived from only one kind of hydrophilic group-containing monomer or may be derived from two or more kinds of hydrophilic group-containing monomers. The hydrophilic group is not particularly limited and may be any of a dissociative group and a nonionic hydrophilic group. The hydrophilic group is preferably a dissociative group, and more preferably an anionic dissociative group, from the view point of self-dispersibility and stability of the formed dispersion or emulsification state. Examples of the dissociative group include a carboxyl group, a phosphoric acid group and a sulfonic acid group, and among these, the dissociative group is preferably a carboxyl group, from the viewpoint of fixing property when used in the ink composition.

The hydrophilic group-containing monomer is preferably a dissociative group-containing monomer and, preferably, a dissociative group-containing monomer having a dissociative group and an ethylenically unsaturated bond from the viewpoints of the self-dispersibility and the aggregation property. Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-(methacryloyloxy)methyl succinate, etc. Specific examples of the unsaturated sulfonic acid monomer include styrenesulfonic acid, 2-acrylamido-2-methylpropanesulfonic acid, 3-sulfopropyl (meth)acrylate, and bis(3-sulfopropyl) itaconate. Specific examples of the unsaturated phosphoric acid monomer include vinylphosphonic acid, vinylphosphate, bis(methacryloyloxyethyl) phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, an unsaturated carboxylic acid monomer is preferred, acrylic type monomer is more preferred, and acrylic acid or methacrylic acid is still more preferred, from the viewpoints of dispersed stability and ejection stability.

The self-dispersing resin particles in the invention preferably contain a polymer having a carboxyl group and contains, more preferably, a polymer having a carboxyl group and an acid value (mgKOH/g) of from 25 to 100, from the viewpoint of the self-dispersibility and the aggregation speed when the ink composition containing the resin particles is in contact with a treatment liquid. The acid value is, more preferably, from 25 to 80 and, particularly preferably, from 30 to 65, from the viewpoints of the self-dispersibility and the aggregation speed when the ink composition containing the resin particles is in contact with the treatment liquid. Particularly, when the acid value is 25 or more, the stability of the self-dispersibility may be more favorable, and when the acid value is 100 or less, the aggregation property may be improved.

The aromatic group-containing monomer is not particularly limited so long as it is a compound containing an aromatic group and a polymerizable group. The aromatic group may be either a group derived from an aromatic hydrocarbon or a group derived from an aromatic heterocycle. In the invention, the aromatic group is preferably an aromatic group derived from the aromatic hydrocarbon, from the viewpoint of the shape stability of particles in the aqueous medium.

The polymerizable group may be either a polycondensating polymerizable group or an addition polymerizing polymerizable group. The polymerizable group is preferably an addition polymerizing polymerizable group, and more preferably, a group containing an ethylenically unsaturated bond, from the viewpoint of shape stability of particles in the aqueous medium.

The aromatic group-containing monomer is preferably an aromatic group-containing (meth)acrylate monomer, and more preferably a monomer containing an aromatic group derived from an aromatic hydrocarbon and also containing an ethylenic unsaturated bond. Only one kind of aromatic group-containing monomer may be used, or two or more kinds of aromatic group-containing monomers may be used in combination.

Examples of the aromatic group-containing monomer include phenoxyethyl (meth)acrylate, benzyl (meth)acrylate, phenyl (meth)acrylate, and styrene type monomer. Among them, from the viewpoints of the balance between the hydrophilicity and the hydrophobicity of the polymer chain and the ink fixing property, an aromatic group-containing (meth)acrylate monomer is preferred, and at least one selected from the group consisting of phenoxyethyl (meth)acrylate, benzyl (meth)acrylate, and phenyl (meth)acrylate is more preferable, and phenoxyethyl (meth)acrylate or benzyl (meth)acrylate is still more preferred. "(Meth)acrylate" means acrylate or methacrylate.

The alicyclic (meth)acrylate contains a structure derived from (meth)acrylic acid and a structure derived from alcohol, in which the structure derived from alcohol contains at least one unsubstituted or substituted alicyclic hydrocarbon group. The alicyclic hydrocarbon group may be a structural portion derived from alcohol itself or may be bonded to the structural portion derived from alcohol via a linking group. The "alicyclic(meth)acrylate" refers to methacrylate or acrylate having an alicyclic hydrocarbon group.

The alicyclic hydrocarbon group is not particularly limited insofar as it contains a non-aromatic cyclic hydrocarbon group. Examples thereof include monocyclic hydrocarbon groups, dicyclic hydrocarbon groups, and polycyclic hydrocarbon groups having tri- or more cycle. Examples of the alicyclic hydrocarbon group include cycloalkyl groups, such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanil group, and a bicyclo[4.3.0]nonane. In the alicyclic hydrocarbon group, the number of carbon atoms of the alicyclic hydrocarbon group portion is preferably 5 to 20 from the viewpoint of viscosity or solubility.

Specific examples of the alicyclic (meth)acrylate are mentioned below. However, the invention is not limited thereto. Examples of monocyclic(meth)acrylates include cycloalkyl (meth)acrylates in which the number of carbon atoms of the cycloalkyl group is 3 to 10, such as cyclopropyl(meth)acrylate, cyclobutyl(meth)acrylate, cyclopentyl(meth)acrylate, cyclohexyl(meth)acrylate, cycloheptyl(meth)acrylate, cyclooctyl(meth)acrylate, cyclononyl(meth)acrylate, or cyclodecyl(meth)acrylate. Examples of dicyclic(meth)acrylates include isobornyl(meth)acrylate and norbornyl(meth)acrylate. Examples of tricyclic(meth)acrylates include adamanthyl(meth)acrylate, dicyclopentanyl(metha)acrylate, and dicyclopentenyloxyethyl(meth)acrylate. These substances can be used singly or as a mixture of two or more kinds thereof. Among the above, from the viewpoint of dispersion stability, fixability, and blocking resistance of self-dispersing polymer particles, dicyclic(meth)acrylates or polycyclic (meth)acrylates having tri- or more cycle are preferable, and at least one member selected from isobornyl(meth)acrylate, adamanthyl(meth)acrylate, and dicyclopentanyl(metha)acrylate is more preferable.

The self-dispersing resin particles in the invention preferably contain a constituent unit derived from the aromatic group-containing (meth)acrylate monomer or derived from the alicyclic meth(acrylate), and the content thereof is, preferably, from 10% by mass to 95% by mass. When the content of the aromatic group-containing (meth)acrylate monomer or the alicyclic meth(acrylate) is from 10% by mass to 95% by mass, the stability of the self-emulsified or dispersed state may be improved and, further, increase in the viscosity of an ink can be suppressed. In the invention, the content of the aromatic group-containing (meth)acrylate monomer or the alicyclic meth(acrylate) is, more preferably, from 15% by mass to 90% by mass, further preferably, from 15% by mass to 80% by mass and, particularly preferably, from 25% by mass to 70% by mass, from the viewpoint of the stability of the self-dispersed state, stabilization for the shape of the particles in the aqueous medium due to hydrophobic interaction between aromatic rings to each other, and lowering of the amount of the water-soluble component due to appropriate hydrophobic property of the particles.

The self-dispersing resin particles in the invention can be formed by using, for example, a constituent unit derived from an aromatic group-containing monomer or derived from an alicyclic (meth)acrylate and a constituent unit derived from a dissociative group-containing monomer. The resin particles may further contain other constituent units if necessary.

Any monomer copolymerizable with the aromatic group-containing monomer or the alicyclic (meth)acrylate and the dissociative group-containing monomer may be used as a monomer for forming the other constituent units. In particular, such a monomer is preferably an alkyl group-containing monomer, from the viewpoint of polymer skeleton flexibility or easiness of glass transition temperature (Tg) control. Examples of the alkyl group-containing monomer include (meth)acrylic ester monomers such as alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, tert-butyl (meth)acrylate, hexyl (meth)acrylate, and ethylhexyl (meth)acrylate, hydroxyl group-containing ethylenic unsaturated monomers such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate, and dialkylaminoalkyl (meth)acrylate such as dimethylaminoethyl (meth)acrylate; and (meth)acrylamide monomers such as (meth)acrylamides such as N-hydroxyalkyl (meth)acrylamides such as N-hydroxymethyl (meth)acrylamide, N-hydroxyethyl (meth)acrylamide, and N-hydroxybutyl (meth)acrylamide, and N-alkoxyalkyl (meth)acrylamides such as N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide, and N-(n-, iso)butoxyethyl (meth)acrylamide.

A weight-average molecular weight of the water-insoluble polymer that is used in the self-dispersing resin particles in the invention is, preferably, from 3,000 to 200,000 and, more preferably, from 5,000 to 150,000 and, further preferably, from 10,000 to 100,000. The amount of the water-soluble component can be suppressed effectively when the weight average molecular weight is 3,000 or more. Further, the self-dispersed stability can be increased when the weight average molecular weight is 200,000 or less.

The weight average molecular weight was measured by gel permeation chromatography (GPC). In GPC, HLC-8220GPC (trade name, manufactured by Tosoh Corporation) was used, and TSKgel Super HZM-H, TSKgel SuperHS400, TSKgel SuperHZ2000 (trade names; these are manufactured by Tosoh Corporation) were used as the column, and THF (tetrahydrofuran) was used as an eluate.

The water-insoluble polymer used for the self-dispersing resin particles in the invention preferably contains a structural unit derived from an aromatic group-containing (meth)acrylate monomer (preferably, a structural unit derived from phenoxyethyl (meth)acrylate and/or benzyl (meth)acrylate) or a structural unit derived from an alicyclic (meth)acrylate (preferably, a structural unit derived from at least one of isobonyl (meth)acrylate, adamantyl (meth)acrylate and dicyclopentanyl (meth)acrylate) at from 15% by mass to 80% by mass as the copolymerization ratio based on the entire mass of the self-dispersing resin particles from the viewpoint of controlling the hydrophilicity and hydrophobicity of the polymer.

Further, the water-insoluble polymer preferably contains a constituent unit derived from an aromatic group-containing (meth)acrylate monomer at from 15% by mass to 80% by mass as the copolymerization ratio, a constituent unit derived from a carboxyl group-containing monomer, and a constituent unit derived from an alkyl group-containing monomer (preferably, a constituent unit derived from (meth)acrylic acid alkyl ester). The water-insoluble polymer more preferably contains a structural unit derived from phenoxyethyl (meth)acrylate and/or benzyl (meth)acrylate, or a structural unit derived from at least one of isobonyl (meth)acrylate, adamantyl (meth)acrylate and dicyclopentanyl (meth)acrylate, at from 15 to 80% by mass as the copolymerization ratio; a constituent unit derived from a carboxyl group-containing monomer; and a constituent unit derived from an alkyl group-containing monomer (preferably, a structural unit derived from an ester of alkyl having 1 to 4 carbon atoms and (meth)acrylic acid). Further, the water-insoluble polymer has preferably an acid value of from 25 to 100 and a weight average molecular weight of from 3,000 to 200,000 and, more preferably, an acid value of from 25 to 95 and a weight average molecular weight of from 5,000 to 150,000, from the viewpoints of controlling the hydrophilicity and hydrophobicity of the polymer.

As specific examples of the water-insoluble polymer that is used in the self-dispersing resin particles, exemplary compounds B-01 to B-32 are shown below but the invention is not limited to them. Numerical values described in each parenthesis represent the mass ratio of the copolymer components.

B-01: phenoxyethyl acrylate/methyl methacrylate/acrylic acid copolymer (50/45/5)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/methacrylic acid copolymer (50/44/6)

B-04: phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/acrylic acid copolymer (10/50/35/5)

B-07: benzyl acrylate/methyl methacrylate/acrylic acid copolymer (55/40/5)

B-08: phenoxyethyl methacrylate/benzyl acrylate/methacrylic acid copolymer (45/47/8)

B-09: styrene/phenoxyethyl acrylate/butyl methacrylate/acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxyethyl methacrylate/butyl acrylate/acrylic acid copolymer (50/5/20/25)

B-14: styrene/butyl acrylate/acrylic acid copolymer (62/35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

B-20: methyl methacrylate/isobonyl methacrylate/methacrylic acid copolymer (20/72/8)

B-21: methyl methacrylate/isobonyl methacrylate/benzyl methacrylate/methacrylic acid copolymer (30/50/14/6)

B-22: methyl methacrylate/dicyclopentanyl methacrylate/methacrylic acid copolymer (40/50/10)

B-23: methyl methacrylate/dicyclopentanyl methacrylate/phenoxyethyl methacrylate/methacrylic acid copolymer (30/50/14/6)

B-24: methyl methacrylate/isobonyl methacrylate/methoxy polyethylene glycol methacrylate (n=2)/methacrylic acid copolymer (30/54/10/6)

B-25: methyl methacrylate/dicyclopentanyl methacrylate/methoxy polyethyleneglycol methacrylate(n=2)/methacrylic acid copolymer (54/35/5/6)

B-26: methyl methacrylate/adamantyl methacrylate/methoxy polyethylene glycol methacrylate (n=23)/methacrylic acid copolymer (30/50/15/5)

B-27: methyl methacrylate/isobonyl methacrylate/dicyclopentanyl methacrylate/methacrylic acid copolymer (20/50/22/8)

B-28: ethyl methacrylate/cyclohexyl methacrylate/acrylic acid copolymer (50/45/5)

B-29: isobutyl methacrylate/cyclohexyl methacrylate/acrylic acid copolymer (40/50/10)

B-30: n-butyl methacrylate/cyclohexyl methacrylate/styrene/acrylic acid copolymer (30/55/10/5)

B-31: methyl methacrylate/dicyclopentenyloxy ethyl methacrylate/methacrylic acid copolymer (40/52/8)

B-32: lauryl methacrylate/dicyclopentenyloxy ethyl methacrylate/methacrylic acid copolymer (25/65/10)

The method of producing a water-insoluble polymer that is used in the self-dispersing resin particles in the invention is not particularly limited. Examples of the method of producing the water-insoluble polymer include a method of performing emulsion polymerization under the presence of a polymerizable surfactant thereby covalently-bonding the surfactant and the water-insoluble polymer and a method of copolymerizing a monomer mixture containing the hydrophilic group-containing monomer and the aromatic group-containing monomer by a known polymerization method such as a solution polymerization method or a bulk polymerization method. Among the polymerization methods described above, the solution polymerization method is preferred and a solution polymerization method of using an organic solvent is more preferred from the viewpoint of aggregation speed and the stability of droplet ejection when the self-dispersing resin particles are used for an ink composition.

From the viewpoint of the aggregation speed, it is preferred that the self-dispersing resin particles in the invention contain a polymer synthesized in an organic solvent, and the polymer has a carboxyl group (with acid value of preferably from 20 to 100), in which the carboxyl groups of the polymer are partially or entirely neutralized and the polymer is prepared as a polymer dispersion in a continuous phase of water. That is, the self-dispersing resin particle in the invention is preferably prepared by a method including a process of synthesizing the polymer in the organic solvent and a dispersing process of forming an aqueous dispersion in which at least a portion of the carboxyl groups of the polymer is neutralized.

The dispersing process preferably includes the following process (1) and process (2).

Process (1): stirring a mixture containing a polymer (water-insoluble polymer), an organic solvent, a neutralizing agent, and an aqueous medium, Process (2): removing the organic solvent from the mixture.

The process (1) is preferably a treatment that includes at first dissolving the polymer (water-insoluble polymer) in the organic solvent and then gradually adding the neutralizing agent and the aqueous medium, and mixing and stirring them to obtain a dispersion. By adding the neuturalizing agent and the aqueous medium to the solution of the water-insoluble polymer dissolved in the organic solvent, self-dispersing resin particles having a particle size that enables higher storage stability can be obtained without requiring strong sharing force. The stirring method for the mixture is not particularly limited and a mixing and stirring apparatus that is used generally can be used, and if necessary, a disperser such as a ultrasonic disperser or a high pressure homogenizer can be used.

Preferable examples of the organic solvent include alcohol type solvents, ketone type solvents and ether type solvents. Examples of the alcohol type solvent include isopropyl alcohol, n-butanol, t-butanol, and ethanol. Examples of the ketone type solvent include acetone, methyl ethyl ketone, diethyl ketone, and methyl isobutyl ketone. Examples of the ether type solvent include dibutyl ether and dioxane. Among the solvents, the ketone type solvent such as methyl ethyl ketone and the alcohol type solvent such as isopropyl alcohol are preferred. Further, with an aim of moderating the change of polarity at the phase transfer from an oil system to an aqueous system, combined use of isopropyl alcohol and methyl ethyl ketone is also preferred. By the combined use of the solvents, self-dispersing resin particles of small particle size with no aggregation settling or fusion between particles to each other and having high dispersed stability may be obtained.

The neutralizing agent is used to partially or entirely neutralize the dissociative groups so that the self-dispersing polymer can form a stable emulsified or dispersed state in water. In the case where the self-dispersing polymer of the invention has an anionic dissociative group (for example, a carboxyl group) as the dissociative group, examples of the neutralizing agent to be used include basic compounds such as organic amine compounds, ammonia, and alkali metal hydroxides. Examples of the organic amine compounds include monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethylethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine, etc. Examples of the alkali metal hydroxide include lithium hydroxide, sodium hydroxide and potassium hydroxide. Among them, sodium hydroxide, potassium hydroxide, triethylamine, and triethanolamine are preferred from the viewpoint of the stabilization of dispersion of the self-dispersing resin particles of the invention into water.

The basic compound is used preferably in an amount of from 5% by mol to 120% by mol and, more preferably, by from 10% by mol to 110% by mol and, further preferably, by from 15% by mol to 100% by mol, relative to 100% by mol of the dissociative groups. When the basic compound is used in an amount of 5% by mol or more, the effect of stabilizing the dispersion of the particles in water may be obtained and when the basic compound is in an amount of 120% or less, the effect of decreasing the water-soluble component may be provided.

In the process (2), an aqueous dispersion of the self-dispersing resin particles can be obtained by phase transfer to the aqueous phase by distilling off the organic solvent from the dispersion obtained in the process (1) by a common method such as distillation under a reduced pressure. In the obtained aqueous dispersion, the organic solvent has been substantially removed and the amount of the organic solvent is preferably 0.2% by mass or less and, more preferably, 0.1% by mass or less.

The average particle size of the resin particles (particularly, self-dispersing polymer particles) is, preferably, in a range from 10 nm to 400 nm, more preferably in a range from 10 nm to 200 nm, further preferably, in a range from 10 nm to 100 nm and, particularly preferably, in a range from 10 nm to 50 nm, as the volume average particle size. The production adaptability may be improved when the average particle size is 10 nm or more. The storage stability may be improved when the average particle size is 400 nm or less. The particle size distribution of the resin particles is not particularly limited and it may be either a wide particle size distribution or a monodispersed particle size distribution. Further, two or more types of water-insoluble particles may be used in combination.

The average particle size and the particle size distribution of the resin particles can be determined by measuring the volume average particle size by means of a dynamic light scattering method using a particle size distribution measuring apparatus NANOTRACK UPA-EX150 (trade name, manufactured by Nikkiso Co., Ltd.).

The content of the resin particles (particularly, self-dispersing resin particles) in the liquid composition is, preferably, from 1% by mass to 30% by mass and, more preferably, from 5% by mass to 15% by mass, relative to the liquid composition, from the viewpoint of the glossiness of an image and the like. Only one kind of the resin particles (particularly, self-dispersing resin particles) can be used, or two or more kinds of the resin particles can be used in combination.

Water-Soluble Organic Solvent

The aqueous ink composition of the invention includes at least one water-soluble organic solvent with which the $MFT^{25}$ and the $MFT^0$ of the resin particles of the aqueous ink composition satisfy the relationship of $MFT^0-MFT^{25} \geq 40°$ C. Since the ink composition contains the resin particles together with the water-soluble organic solvent, the MTF of the polymer particles in the ink composition can be kept at a relatively low level, so that the ejection performance and so on can be maintained well.

The $MFT^{25}$ is a minimum film-forming temperature of the resin particles that is determined using a mixture obtained by mixing the resin particles with a water-soluble organic solvent in an amount of 25% by mass relative to the solid content of the resin particles, and water.

In the present invention, the $MFT^{25}$ is at least 40° C. lower than the $MFT^0$. If the temperature difference obtained by subtracting the $MFT^{25}$ from the $MFT^0$ ($MFT^0-MFT^{25}$) is less than 40° C., when the amount of heat for heating and fixing increases, the scratch resistance of the recorded image may be lowered, and cleanability at maintenance operation may also be lowered. In the present invention, from the view point of cleanability of the ink composition when the ink composition adheres to, for example, the nozzle surface of the ink jet head and is solidified, the $MFT^{25}$ is preferably 40° C. to 85° C. lower than the $MFT^0$, and more preferably 40° C. to 70° C. lower than the $MFT^0$.

In the present invention, the temperature difference obtained by subtracting the $MFT^{25}$ from the $MFT^0$ ($MFT^0-MFT^{25}$) within the above described range may be obtained by properly selecting the water-soluble organic solvent and/or the amount thereof.

It is preferable that the $MFT^0$ is in a range of from 80° C. to 150° C. and the $MFT^{25}$ is 40° C. to 85° C. (preferably 40° C. to 70° C.) lower than the $MFT^0$.

The water-soluble organic solvent used in the ink composition is preferably an (alkyleneoxy)alcohol or an (alkyleneoxy)alkyl ether from the viewpoint of lowering the $MFT^{25}$ thereby adjusting the temperature difference between the $MFT^0$ and the $MFT^{25}$ ($MFT^0-MFT^{25}$) to 40° C. or more. For the same reason, the ink composition preferably contains two or more water-soluble organic solvents, and when it contains two or more water-soluble organic solvents, at least one of them is preferably an (alkyleneoxy)alcohol, and in particular, the two or more water-soluble organic solvents preferably include at least one (alkyleneoxy)alcohol and at least one (alkyleneoxy)alkyl ether.

The (alkyleneoxy)alcohol is preferably a (propyleneoxy)alcohol. Examples of the (propyleneoxy)alcohol include SANNIX GP250 and SANNIX GP400 (trade names, each manufactured by Sanyo Chemical Industries, Ltd.).

The (alkyleneoxy)alkyl ether is preferably an (ethyleneoxy)alkyl ether having an alkyl moiety of 1 to 4 carbon atoms or a (propyleneoxy)alkyl ether having an alkyl moiety of 1 to 4 carbon atoms. Examples of the (alkyleneoxy)alkyl ether include ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether.

In the invention, the resin particles are preferably self-dispersing resin particles, and the water-soluble organic solvent is preferably a (propyleneoxy)alcohol and an (ethyleneoxy)alkyl ether (with an alkyl moiety of 1 to 4 carbon atoms) and/or a (propyleneoxy)alkyl ether (with an alkyl moiety of 1 to 4 carbon atoms). More preferably, the resin particles are self-dispersing resin particles containing a water-insoluble polymer having a hydrophilic constituent unit and a constituent unit derived from an aromatic group-containing monomer, and the water-soluble organic solvent is a (propyleneoxy)alcohol and an (ethyleneoxy)alkyl ether (with an alkyl moiety of 1 to 4 carbon atoms) and/or a (propyleneoxy)alkyl ether (with an alkyl moiety of 1 to 4 carbon atoms).

In addition to the water-soluble organic solvent, if necessary, any other organic solvent may be added for the purpose of preventing dryness, enhancing penetration, controlling viscosity, or the like. When such an organic solvent is used as an anti-drying agent, nozzle clogging, which could otherwise be caused by the ink dried in the ink discharge port in the process of discharging the ink composition by ink-jet method for image recording, may be effectively suppressed.

For the prevention of drying, a water-soluble organic solvent having a vapor pressure lower than that of water is preferably used. Examples of the water-soluble organic solvent suitable for the prevention of drying include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane, heterocyclic compounds such as 2-pyrrolidone, N-methyl-2-pyrrolidone, 1,3-dimethyl-2-imidazolidinone, and N-ethylmorpholine, sulfur-containing compounds such as sulfolane, dimethylsulfoxide and 3-sulfolene, polyfunctional compounds such as diacetone alcohol and diethanolamine, and urea derivatives. In particular, polyhydric alcohols such as glycerin and diethylene glycol are preferred.

In order to enhance the penetration, an organic solvent may be used for better penetration of the ink composition into recording media. Examples of the organic solvent suitable for penetration enhancement include alcohols such as ethanol, isopropanol, butanol, and 1,2-hexanediol, sodium lauryl sulfate, sodium oleate, and nonionic surfactants. Besides the above, a water-soluble organic solvent may also be used to control viscosity. Examples of the water-soluble hydrophilic organic solvent that may be used to control viscosity include alcohols (for example, methanol, ethanol and propanol), amines (for example, ethanolamine, diethanolamine, triethanolamine, ethylenediamine, and diethylenetriamine), and other polar solvents (for example, formamide, N,N-dimethylformamide, N,N-dimethylacetamide, dimethylsulfoxide, sulfolane, 2-pyrrolidone, acetonitrile, and acetone).

Water

The ink composition includes water. There is no limitation for the content of water. The ink composition may preferably contain water in an amount of from 10 to 99% by mass, more preferably from 30% to 80% by mass, and still more preferably from 50% to 70% by mass.

Other Additives

The ink composition may optionally contain other additives, in addition to the components described above. Examples of other additives that may be used in the invention include conventional additives such as a color fading inhibitor, an emulsion stabilizer, a permeation accelerator, an ultraviolet absorber, preservative, a mildew-proofing agent, a pH adjusting agent, a surface tension regulator (for example, a nonionic surfactant, a cationic surfactant, an anionic surfactant, a betaine surfactant), a defoamer, a viscosity adjusting agent, a dispersant, a dispersion stabilizer, an anti-rust agent and a chelating agent. Those various additives may directly be added after preparation of the ink composition, or may be added at the time of preparation of the ink composition.

For smooth ejection in ink-jet methods, the surface tension of the aqueous ink composition is preferably from 20 to 60 mN/m, and more preferably from 20 to 45 mN/m. When the ink is supplied by a method other than the ink-jet method, the surface tension of the ink composition is preferably from 20 to 60 mN/m. The surface tension of the aqueous ink composition is measured by a plate method using Automatic Surface Tensiometer CBVP-Z (trade name, manufactured by Kyowa Interface Science Co., LTD.) under the conditions of a temperature of 25° C.

When the aqueous ink composition is ejected and supplied by ink-jet methods, the viscosity of the ink composition is preferably in the range of from 1 mPa·s to 30 mPa·s, more preferably from 2 mPa·s to 15 mPa·s, particularly preferably from 2 mPa·s to 10 mPa·s, from the viewpoint of ejection stability and the aggregation speed upon contact between the ink composition and the treatment liquid. When the ink is supplied by methods other than ink-jet methods, the viscosity of the ink composition is preferably in the range of from 1 mPa·s to 40 mPa·s. The viscosity of the aqueous ink composition can be measured, for example, using a Brookfield viscometer.

(b) Maintenance Liquid

A maintenance liquid included in the ink set of the invention at least contains an organic solvent and water and preferably contains a surfactant, and, as required, can further contain other additives.

In the invention, the "maintenance" includes keeping and holding a recording head for ejecting ink-jet recording inks and the ejection performance thereof as expected (initial state) or almost as expected, and also washing (cleaning) the recording head to fix and maintain the same in a more favorable state.

Organic Solvent

The maintenance liquid in the invention contains at least one organic solvent. The organic solvent is not particularly limited, and a water soluble organic solvent is preferable from the viewpoint of excellent cleanability of the aqueous ink compositions and less necessity of additives, such as surfactants.

The organic solvents can be suitably selected from the water-soluble organic solvents and other organic solvents mentioned as the organic solvents usable in the aqueous ink composition as previously described above. In particular, in terms of an increase in solubility of adhered and solidified ink, the (alkyleneoxy)alcohol and the (alkyleneoxy)alkyl ether are preferable and the (alkyleneoxy)alkyl ether is particularly preferable. The details of the alkyleneoxy alcohol and the (alkyleneoxy)alkyl ether are as described above. Among the (alkyleneoxy)alkyl ether, an ethyleneoxy alkyl ether in which the number of carbon atoms of the alkyl portion is 1 to 4 or a propyleneoxy alkyl ether in which the number of carbon atoms of the alkyl portion is 1 to 4 are preferable for the use in the maintenance liquid.

The content of the organic solvent in the maintenance liquid is preferably in the range of 1 to 50% by mass and more preferably in the range of 10 to 50% by mass relative to the total mass of the maintenance liquid. When the content of the organic solvent is 1% by mass or more, the cleanability of the aqueous ink composition may be excellent. When the content thereof is adjusted to be 50% by mass or lower, the cleanability of the aqueous ink composition can be maintained high.

In the maintenance liquid in the invention, from the viewpoint that the cleanability of the aqueous ink composition that adheres and solidifies at the nozzle surface of the ink-jet head or the like becomes excellent, it is more preferable that the (alkyleneoxy)alkyl ether be contained as the organic solvent and the proportion of the (alkyleneoxy)alkyl ether be 50% by mass or more relative to the whole organic solvent. In this case, for the same reasons as above, the proportion of the (alkyleneoxy)alkyl ether relative to the whole organic solvent is more preferably 55% by mass or more, and particularly preferably 60% by mass or more. The upper limit is not particularly limited.

The pH (25±1° C.) of the maintenance liquid is preferably in the range of 6 to 11 from the viewpoint of influences on aggregation of contents of the aqueous ink composition.

When the pH is 6 or more, the aggregation of contents of the ink composition occurring near a head member, such as the nozzle surface of the ink-jet head, may be suppressed. When the pH is 11 or lower, it is effective for suppressing deterioration of a liquid repellent film of the head. In particular, the pH ($25\pm1°$ C.) is more preferably in the range of 7 to 10. In this case, the pH ($25\pm1°$ C.) of the aqueous ink composition is preferably 7.5 to 9.5 (more preferably 8.0 to 9.0). In particular, it is preferable that the pH ($25\pm1°$ C.) of the ink composition be 7.5 or more and the pH ($25\pm1°$ C.) of the maintenance liquid be 6 to 11 from the viewpoint of the properties of the aqueous ink composition and an increase in washing effects thereof.

Surfactant

The maintenance liquid in the invention preferably contains a surfactant. Preferable examples of the surfactant include anionic surfactants, such as fatty acid salts, alkyl carboxylate salts, alkyl sulfate ester salts, alkyl sulfonate salts, alkylbenzene sulfonate salts, alkylnaphthalene sulfonate salts, dialkyl sulfosuccinate salts, alkyl phosphate ester salts, naphthalenesulfonic acid formalin condensates, or polyoxyethylene alkyl sulfate ester salts and nonionic surfactants, such as polyoxyethylene alkyl ethers, polyoxyethylene alkyl aryl ethers, polyoxyethylene fatty acid esters, sorbitan fatty acid esters, polyoxyethylene sorbitan fatty acid esters, acetylenediol derivatives, polyoxyethylene alkyl amines, glycerol fatty acid esters, or oxyethylene oxypropylene block copolymers.

In particular, acetylenediol derivatives, sodium alkyl carboxylates, or sodium alkyl sulfonates are more preferable in terms of, for example, not causing an aggregation reaction with inks.

The content of the surfactant in the maintenance liquid is preferably 0.5 to 10% by mass and more preferably 1 to 3% by mass relative to the total mass of the maintenance liquid. The content of the surfactant within the range is advantageous in terms of cleanability.

Water

The maintenance liquid contains water. The content of water in the maintenance liquid is not particularly limited. The content of water in the maintenance liquid is preferably from 1 to 40% by mass.

Other Additives

The maintenance liquid may optionally contain other additives, in addition to the components described above. Examples of other additives that may be used in the maintenance liquid include conventional additives such as a color fading inhibitor, an emulsion stabilizer, a permeation accelerator, an ultraviolet absorber, a preservative, a mildew-proofing agent, a pH adjusting agent, a surface tension regulator (for example, a nonionic surfactant, a cationic surfactant, an anionic surfactant, a betaine surfactant), a defoamer, and a viscosity adjusting agent.

(c) Aqueous Treatment Liquid

The ink set of the present invention may include an aqueous treatment liquid that is capable of aggregating and fixing the components of the aqueous ink composition upon contact with the aqueous ink composition. The use of the ink composition in combination with the treatment liquid allows faster ink-jet recording and also allows the formation of images with high density and resolution and high drawing quality (such as reproducibility of fine lines or portions) even in high-speed recording.

The aqueous treatment liquid (hereinafter, may also be simply referred to as "treatment liquid") may contain at least an aggregating component capable of aggregating components, such as a pigment and resin particles, contained in the aqueous ink composition, and also may contain an organic solvent and/or water, in general. The aqueous treatment liquid may further include a surfactant, as necessary.

Examples of the treatment liquid include a liquid capable of forming an aggregate at the liquid composition by changing the pH of the liquid composition. The pH of the treatment liquid (at $25°$ C.$\pm1°$ C.) is, preferably, from 1 to 6, more preferably, from 1.2 to 5 and, further preferably, from 1.5 to 4, from the viewpoint of the aggregation speed of the liquid composition. In this case, the pH of the liquid composition (at $25°$ C.$\pm1°$ C.) used in the ejection process is, preferably from 7.5 to 9.5 (more preferably, from 8.0 to 9.0)). It is preferred that the pH of the liquid composition (at $25°$ C.) is 7.5 or higher and the pH of the treatment liquid (at $25°$ C.) is from 1.5 to 3, from the viewpoint of the image density, the resolution and increase in the ink-jet recording speed.

One kind of the aggregating component can be used singly, or two or more kinds of aggregating components can be used in combination.

The treatment liquid may include at least one acidic compound as the aggregating component. Examples of the acidic compound that may be used include compounds having a phosphoric acid group, a phosphonic acid group, a phosphinic acid group, a sulfuric acid group, a sulfonic acid group, a sulfinic group, or a carboxyl group, and salts thereof (such as polyvalent metal salts). Particularly, in view of the aggregation speed of the ink composition, compounds having a phosphoric acid group or a carboxyl group are more preferred, and compounds having a carboxyl group is further preferred.

The carboxyl group-containing compound is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, ortho-phosphoric acid, pyrrolidone carboxylic acid, pyrone carboxylic acid, pyrrole carboxylic acid, furancarboxylic acid, pyridinecarboxylic acid, coumarinic acid, thiophencarboxylic acid, nicotinic acid, derivatives of these compounds, or salts thereof (such as polyvalent metal salts). One of these compounds may be used singly or two or more of these compounds may be used in any combination.

In the invention, the treatment liquid may include an aqueous solvent (such as water) in addition to the acidic compound.

From the viewpoint of the aggregating effect, the content of the acidic compound in the treatment liquid is preferably from 5% by mass to 95% by mass, more preferably from 10% by mass to 80% by mass, further preferably from 15% by mass to 50% by mass, particularly preferably from 18% by mass to 30% by mass, based on the total mass of the treatment liquid.

Preferred examples of the treatment liquid that may improve the high speed aggregation property include a treatment liquid including a polyvalent metal salt or a polyallyl amine. Examples of the polyvalent metal salt and a polyallyl amine include salts of alkaline earth metals belonging to group 2 of the periodic table (for example, magnesium and calcium), salts of a transition metal belonging to group 3 of the periodic table (for example, lanthanum), salts of a cation of a metal belonging to group 13 of the periodic table (for example, aluminum), salts of a lanthanide (for example, neodium), polyallylamine and polyallylamine derivatives. As the metal salts, carboxylic acid salts (such as, salts of formic acid, salts of acetic acid, and salts of benzoic acid), nitric acid salts, chlorides, and thiocyanic acid salts are preferred, and calcium salt or magnesium salt of a carboxylic acid (such as salts of formic acid, salts of acetic acid, and salts of benzoic acid), calcium salt of nitric acid or magnesium salt of nitric acid, calcium chloride, magnesium chloride, and calcium salt of thiocyanic acid or magnesium salt of thiocyanic acid are more preferred.

From the viewpoint of the aggregating effect, the content of the metal salt in the treatment liquid is preferably from 1% by mass to 10% by mass, more preferably from 1.5% by mass to 7% by mass, and further preferably from 2% by mass to 6% by mass.

The treatment liquid may include at least one cationic organic compound as the aggregating component. Examples of the cationic organic compound include cationic polymers such as poly(vinylpyridine) salts, polyalkylaminoethyl acrylate, polyaklylaminoethyl methacrylate, poly(vinylimidazole), polyethyleneimine, polybiguanide, polyguanide, and polyallyamine, and derivatives thereof.

From the viewpoint of the viscosity of the treatment liquid, the weight average molecular weight of the cationic polymer is preferably low. When the treatment liquid is supplied to the recording medium by ink-jet method, the weight average molecular weight is preferably in the range of from 1,000 to 500,000, more preferably from 1,500 to 200,000, and further preferably from 2,000 to 100,000. A weight average molecular weight of 1,000 or more is advantageous from the viewpoint of the aggregation speed, and a weight average molecular weight of 500,000 or less is advantageous from the viewpoint of ejection reliability. However, this does not always apply to cases where the treatment liquid is supplied to the recording medium by methods other than ink-jet methods.

The cationic organic compound is also preferably a primary, secondary or tertiary amine salt type compound. Examples of such an amine salt type compound include cationic compounds such as hydrochlorides or acetates of compounds (for example, laurylamine, coconut amine, stearylamine, and rosin amine), quaternary ammonium salt type compounds (for example, lauryltrimethylammonium chloride, cetyltrimethylammonium chloride, lauryldimethylbenzylammonium chloride, benzyltributylammonium chloride, and benzalkonium chloride), pyridinium salt type compounds (for example, cetylpyridinium chloride and cetylpyridinium bromide), imidazoline type cationic compounds (for example, 2-heptadecenyl-hydroxyethylimidazoline), higher alkylamine ethylene oxide adducts (for example, dihydroxyethylstearylamine); and amphoteric surfactants capable of being cationic in the desired pH range, such as amino acid type amphoteric surfactants, R—NH—CH$_2$CH$_2$—COOH type compounds, carboxylic salt type amphoteric surfactants (for example, stearyl dimethyl betaine and lauryl dihydroxyethyl betaine), and sulfate ester type, sulfonate type, or phosphate ester type amphoteric surfactants.

In particular, di- or higher valent cationic organic compounds are preferred.

From the viewpoint of the aggregating effect, the content of the cationic organic compound in the treatment liquid is preferably from 1 to 50% by mass, more preferably from 2 to 30% by mass.

Above all, the aggregating component is preferably a di- or higher valent carboxylic acid (more preferably, divalent or trivalent carboxylic acid) or a di- or higher valent cationic organic compound, from the viewpoint of the aggregation property and the scratch resistance of images.

From the viewpoint of the aggregation speed of the ink composition, the viscosity of the treatment liquid is preferably in the range of from 1 mPa·s to 30 mPa·s, more preferably from 1 mPa·s to 20 mPa·s, further preferably from 2 mPa·s to 15 mPa·s, particularly preferably from 2 mPa·s to 10 mPa·s. The viscosity is measured using VISCOMETER TV-22 (trade name, manufactured by TOKI SANGYO CO., LTD.) under the condition of a temperature of 20° C.

From the viewpoint of the aggregation speed of the ink composition, the surface tension of the treatment liquid is preferably from 20 mN/m to 60 mN/m, more preferably from 20 mN/m to 45 mN/m, further preferably from 25 mN/m to 40 mN/m. The surface tension is measured using Automatic Surface Tensiometer CBVP-Z (trade name, manufactured by Kyowa Interface Science Co., LTD.) under the condition of a temperature 25° C.

In the invention, the treatment liquid may generally contain a water-soluble organic solvent in addition to the aggregating component. The treatment liquid may also include other various additives, as long as the effects of the invention are not impaired. The details of the water-soluble organic solvent may be the same as those described above for the aqueous ink composition. Examples of the other additives include conventional additives such as anti-drying agent (moistening agent), a color fading inhibitor, an emulsion stabilizer, a permeation accelerator, an ultraviolet absorber, a preservative, a mildew-proofing agent, a pH adjusting agent, a surface tension regulator, a defoamer, a viscosity adjusting agent, a dispersant, a dispersion stabilizer, an anti-rust agent, and a chelating agent.

Image Recording Method

The image recording method of the invention includes recording an image by ejecting an ink by an ink-jet method, using the ink set of the invention. Since the ink set of the invention is used, it is possible to stably perform recording of a high quality image that has excellent scratch resistance, over an extended time period, while occurrence of blocking may be suppressed.

The image recording method of the invention is not particularly limited as long as it is a method in which the ink set of the invention is used. The image recording method may be, for example, a method including supplying the aqueous ink composition to a recording medium by an ink-jet method (ink supplying process), and supplying a maintenance liquid to a head component such as a nozzle surface of the ink-jet head and washing away the aqueous ink composition (maintenance process). Preferably, the method may further include supplying an aqueous treatment liquid that is used for aggregating and fixing the components in the aqueous ink composition upon contact with the aqueous ink composition (treatment liquid supplying process). The ink-jet recording method may further include other processes, as necessary.

Ink Supplying Process

In the ink supplying process, the aqueous ink composition is supplied to a recording medium by an ink-jet method. In this process, the ink composition may be selectively supplied to the recording medium so that the desired visible image can be formed. The details of the components of the ink composition of the invention and preferable embodiments are described in the above.

The ink-jet method is not particularly limited and may be of any known system, for example, a charge control system of ejecting an ink utilizing an electrostatic attraction force, a drop on demand system of utilizing a vibration pressure of a piezo element (pressure pulse system), an acoustic ink-jet system of converting electric signals into acoustic beams, irradiating them to an ink, and ejecting the ink utilizing a radiation pressure, and a thermal ink-jet system of heating an ink to form bubbles and utilizing the resultant pressure (BUBBLEJET (registered trade mark)).

The ink-jet head used in the ink-jet method may be either an on-demand system or a continuous system. Specific examples of the ejection system include an electric-mechanical conversion system (for example, single cavity type, double cavity type, bender type, piston type, share mode type, and shared wall type, etc.), an electric-thermal conversion system (for example, thermal ink-jet type, BUBBLEJET (registered trade mark) type, etc.), an electrostatic attraction system (for example, electric field control type, and slit jet type, etc.), and an electric discharge system (for example, spark jet type, etc.) and any of the ejection systems may be used. Ink nozzles, etc. used for recording by the ink-jet method are not particularly limited and may be selected properly depending on the purpose. Examples of the ink-jet head include an ink-jet head of a shuttle system in which a short serial head is used and recording is performed while allowing the head to scan in the lateral direction of a recording medium, and an ink-jet head of a line system in which a line head in which recording elements are arranged corresponding to the entire region for one side of a recording medium is used. In the line system, an image can be recorded over the entire surface of the recording medium by allowing the recording medium to be scanned in the direction orthogonal with the direction of arranging the recording elements, in which a conveying system such as a carriage by which the short head moves for scanning is not necessary. Further, since complicate scanning control for the movement of the carriage and the recording medium is not necessary and only the recording medium is moved, higher recording speed can be attained as compared with the shuttle system. While the image recording method of the invention is applicable to any one of them, the effect of improving the ejection accuracy and the scratch resistance of the image is generally remarkable when the ink-jet recording method of the invention is applied to the line system, in which dummy jetting is not performed.

Maintenance Process

In a maintenance process, the maintenance liquid is supplied to head members, such as the nozzle surface of the ink-jet head, to wash away the aqueous ink composition adheres to and solidifies on the head members or the like. The maintenance liquid is supplied by, for example, applying the maintenance liquid to the nozzle surface by coating methods or ejecting the maintenance liquid thereto by ink-jet methods. The ink-jet methods are as described in the ink supplying process and the coating methods are described below.

As the maintenance using the maintenance liquid of the invention, any method may be selected insofar as the maintenance liquid is supplied to desired portions to thereby remove inks adhered and solidified or the like from the viewpoint of preventing staining, clogging, or the like due to adhesion of the inks. For example, the maintenance liquid may be supplied to the nozzle surface of the recording head of an ink-jet recording device, and then the nozzle surface may be wiped.

In this case, the maintenance liquid can be supplied by, for example, roller coating or spraying. In removing the adhered and solidified ink (adhered ink), a method including supplying the maintenance liquid, and then rubbing (wiping) the nozzle surface using a wiper blade to remove the adhered ink, a method including removing the adhered ink by wind pressure, liquid pressure of the maintenance liquid or the like, etc., and a method including wiping off the adhered ink using cloth or papers may be preferable performed. Among the above, the method including wiping off the adhered ink using cloth or papers is particularly preferable. The amount, temperature, and the like of the maintenance liquid in the supplying of the maintenance liquid can be suitably selected according to the liquid composition, the ink type, the amount of the adhered ink, and the like.

In the ink-jet recording method, inks are ejected from nozzles having a diameter as small as about 20 to 50 μm. Therefore, near the vicinity of the nozzle tips, volatilization of low boiling point solvents or water, separation of color materials, thickening of the inks due to aggregation or the like, or formation of precipitates are likely to occur, which may sometimes cause defects, such as disturbance of printing or clogging of the nozzles. These defects are likely to occur during a long idle period of a device. The maintenance liquid in the invention has excellent cleanability of inks and can overcome the defects, such as disturbance of printing or clogging of the nozzles.

The maintenance liquid in the invention can be suitably used for washing a device before an idle period after the use of long hours and for washing a device before operation after a long idle period, as a method for overcoming defects, such as thickening, solidification, or the like of inks due to drying thereof.

Treatment Liquid Supplying Process

In the treatment liquid supplying process, the aqueous treatment liquid capable of fixing by aggregating the components of the aqueous ink composition upon contact with the ink composition is supplied to the recording medium. In this process, the dispersed particles in the ink composition, such as the resin particles and the pigment are aggregated, and the image is fixed on the recording medium. The details of the components of the aqueous treatment liquid and preferable embodiments are described in the above.

The treatment liquid may be supplied using any conventional method such as a coating method, an ink-jet method or an immersion method. The coating method may be performed using a bar coater, an extrusion die coater, an air doctor coater, a bread coater, a rod coater, a knife coater, a squeeze coater, a reverse roll coater, or the like, according to a conventional coating method. The ink-jet method is described in detail above.

The treatment liquid supplying process may be performed before or after the ink supplying process.

In an embodiment of the ink-jet recording method, supplying the ink composition (the ink supplying process) is preferably conducted after supplying an aqueous treatment liquid (the treatment liquid supplying process). That is, in an embodiment, the aqueous treatment liquid for aggregating resin particles, a pigment and the like contained in the liquid composition is supplied onto a recording medium before the aqueous ink composition is supplied onto the recording medium, and supplying the aqueous ink composition so as to be in contact with the aqueous treatment liquid supplied onto the recording medium, thereby forming an image. This can increase ink-jet recording speed and provide an image of high density and resolution even at high speed recording.

The amount of the aqueous treatment liquid supplied is preferably such that the aggregating component (for example, a di- or higher valent carboxylic acid or a di- or higher valent cationic organic compound) can be supplied in an amount of 0.1 g/m$^2$ or more, while it is not particularly limited as long as the aqueous ink composition can be aggregated. In particular, the aggregating component is preferably supplied in an amount of from 0.1 g/m$^2$ to 1.0 g/m$^2$, more preferably from 0.2 g/m$^2$ to 0.8 g/m$^2$. When the amount of the aggregating component supplied is 0.1 g/m$^2$ or more, the aggregation reaction can proceed well. When it is 1.0 g/m$^2$ or less, the glossiness will not become too high, which is preferred.

In the invention, in an exemplary embodiment, the ink supplying process may be preferably performed after the treatment liquid supplying process, and after the treatment liquid is supplied to the recording medium and before the ink composition is supplied, a process of drying the treatment liquid on the recording medium by heating may be preferably performed. When the treatment liquid is previously dried by heating before the ink supplying process, bleeding and so on can be suppressed, so that the coloring ability of the ink can be improved, which may enable visible image recording with good color density and hue. The drying by heating may be performed using conventional heating means such as a heater, air blowing means such as a drier, or a combination thereof. For example, the heating method may be a method of applying heat from a heater or the like to the opposite side of the recording medium from the treatment liquid-coated side, a method of applying warm air or hot air to the treatment liquid-coated side of the recording medium, a method of heating with an infrared heater, or any combination thereof.

Thermally Fixing Process

The image recording method of the invention preferably further includes, after the ink supplying process, bringing a heating surface into contact with the ink image formed by supplying the aqueous ink composition to thermally fix the ink image (thermally fixing process). The thermally fixing treatment facilitates the fixation of the image on the recording medium, so that the scratch resistance of the image can be further improved.

The heating is preferably performed at a temperature equal to or higher than the glass transition temperature (Tg) of the polymer particles in the image. Since the polymer particles are heated to a temperature equal to or higher than the glass transition temperature (Tg), they can be formed into a film to strengthen the image. The heating temperature is, preferably, in a temperature range of Tg+10° C. or higher. Specifically, the heating temperature is preferably in a range from 40° C. to 150° C., and more preferably, in a range from 50° C. to 100° C. For surface smoothening, the pressure applied together with the heat is preferably in the range of from 0.1 MPa to 3.0 MPa, and more preferably from 0.1 MPa to 1.0 MPa.

Preferred examples of the heating method include, but are not limited to, a method of heating with a heating element such as a Nichrome wire heater, a method of supplying warm or hot air, a method of heating with a halogen lamp, an infrared lamp, or the like, and a non-contact drying method. Preferred examples of the method of applying heat and pressure by contacting the heated surface include, but are not limited to, a method of pressing a heating plate against the image-forming side of the recording medium and a method including: using a heating and pressurizing apparatus that includes a pair of heating and pressurizing rollers, a pair of heating and pressurizing belts, or a heating and pressurizing belt placed on the image recording side of the recording medium and a holding roller placed on the opposite side; and allowing the recording medium to pass between the pair of rollers or the like.

The heating and pressurizing roller may be a metal roller made of metal or include a metal core and an elastic material coating layer provided around the core, or if necessary, a surface layer (also referred to as "release layer"). In the latter case, for example, the metal core may be a cylindrical member made of iron, aluminum, SUS, or the like, and at least part of the surface of the metal core is preferably covered with the coating layer. In particular, the coating layer is preferably made of a silicone resin or fluororesin having releasability. A heating element is preferably incorporated in the metal core of one of the heating and pressurizing rollers. The recording medium may be allowed to pass between the rollers so that heating and pressurizing can be performed at the same time, or if necessary, two heating rollers may be used to heat the recording medium between them. For example, the heating element is preferably a halogen lamp heater, a ceramic heater, a Nichrome wire heater, or the like.

Recording Medium

In the image recording method of the invention, the image is recorded on a recording medium.

The recording medium to be used may be, but not limited to, a sheet of cellulose-based general printing paper, such as so-called high-quality paper, coat paper, or art paper, for use in general offset printing. Among the recording medium, a coated paper sheet for use in general offset printing is particularly preferred. Coated paper is produced by applying a coating material to the surface of non-surface-treated cellulose-based general high quality paper, neutralized paper or the like so that a coating layer is formed thereon.

EXAMPLES

The invention is described in detail by way of examples but the invention is not limited to the following examples so long as they are within the gist of the invention. Unless otherwise specified, "part" is based on mass.

The weight average molecular weight was measured by gel permeation chromatography (GPC). In GPC, HLC-8220GPC (trade name, manufactured by Tosoh Corporation) was used, and 3 pieces of TSKgel Super HZM-H, TSKgel Super HZ4000, TSKgel Super HZ2000 (trade name, these are manufactured by Tosoh Corporation) connected in series were used as the column, and THF (tetrahydrofuran) was used as an eluate. Further, the measurement was performed by using an RI detector under the conditions at a sample concentration of 0.35% by mass, a flow rate of 0.35 mL/min, a sample ejection amount of 10 μL, and a measuring temperature of 40° C. A calibration curve was prepared based on eight samples of "standard sample TSK: standard, polystyrene" of "F-40", "F-20", "F-4", "F-1", "A-5000", "A-2500", "A-1000", and "n-propylbenzene", manufactured by Tosoh Corporation.

Examples 1 to 10, Comparative Examples 1 to 3

>Preparation of Aqueous Ink≤
Synthesis of Polymer Dispersant P-1
Polymer dispersant P-1 was synthesized as shown below according to the following scheme:

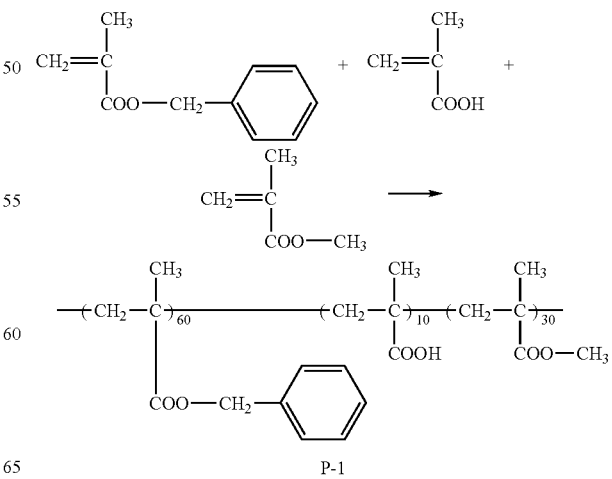

88 g of methyl ethyl ketone was placed in a 1000 mL three-necked flask equipped with a stirrer and a cooling tube and heated to 72° C. in a nitrogen atmosphere, to which a solution in which 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone was dropped over 3 hr. After completing the dropping and further allowing the mixture to react for 1 hr, a solution in which 0.42 g of dimethyl-2,2'-azobisisobutyrate was dissolved in 2 g of methyl ethyl ketone was added, and the resulting mixture was heated for 4 hr while elevating the temperature to 78° C. The obtained reaction solution was re-precipitated twice in a great excess of hexane and a precipitated resin was dried, thereby obtaining 96 g of polymer dispersant P-1.

The composition of the obtained resin was confirmed by $^1$H-NMR and the weight average molecular weight (Mw) determined by GPC was 44,600. Further, an acid value of the obtained resin determined according to the method described in JIS standards (JISK0070:1992, the disclosure of which is incorporated by reference herein) was 65.2 mgKOH/g.

Preparation of Dispersion C of Resin-Coated Pigment Particles

Ten parts of Pigment Blue 15:3 (Phthalocyanine Blue A220 (trade name), a cyan pigment, manufactured by Dainichiseika Color & Chemicals Mfg, Co., Ltd.), 5 parts of the polymer dispersant P-1, 42 parts of methyl ethyl ketone, 5.5 parts of an aqueous 1 N NaOH solution, and 87.2 parts of ion-exchanged water were mixed and dispersed with 0.1 mmϕ zirconia beads for 2 hours to 6 hours in a bead mill.

Methyl ethyl ketone was removed from the resulting dispersion under reduced pressure at 55° C. After part of the water was further removed, the dispersion was centrifuged at 8,000 rpm for 30 minutes using a 50 mL centrifuge tube in a high-speed centrifugal refrigerating machine 7550 (trade name, manufactured by KUBOTA Manufacturing Corporation), and the supernatant separated from the precipitate was collected. The pigment concentration was then determined from the absorption spectrum. As a result, dispersion C of resin-coated pigment particles (the pigment coated with the polymer dispersant) was obtained, whose pigment concentration was 10.2% by mass.

Preparation of Dispersion M of Resin-Coated Pigment Particles

Dispersion M of resin-coated pigment particles (a polymer dispersant-coated pigment) was prepared using the process of preparing dispersion C of the resin-coated pigment particles, except that Pigment Red 122 (a magenta pigment) was used in place of Pigment Blue 15:3 (a cyan pigment).

Preparation of Dispersion Y of Resin-Coated Pigment Particles

Dispersion Y of resin-coated pigment particles (a polymer dispersant-coated pigment) was prepared using the process of preparing dispersion C of the resin-coated pigment particles, except that Pigment Yellow 74 (a yellow pigment) was used in place of Pigment Blue 15:3 (a cyan pigment).

Preparation of Dispersion K of Resin-Coated Pigment Particles

Dispersion K of resin-coated pigment particles (a polymer dispersant-coated pigment) was prepared using the process of preparing dispersion C of the resin-coated pigment particles, except that carbon black (NIPEX 160-IQ (trade name), a black pigment, manufactured by Degussa) was used in place of Pigment Blue 15:3 (a cyan pigment).

(Preparation of Self-Dispersing Polymer Particles)

Synthesis Example 1

In a 2 L three necked flask having a stirrer, a thermometer, a reflux condenser tube, and a nitrogen gas introduction pipe, 560.0 g of methyl ethyl ketone was charged, and the temperature was increased until the temperature outside the reactor reached 87° C. While maintaining a reflux state (hereinafter, refluxing was conducted until the reaction was completed) in the reactor, a solution in which 87.0 g of methyl methacrylate, 406.0 g of "FA-513M" (trade name, manufactured by Hitachi Chemical Co., Ltd.), 29.0 g of "PME-100" (trade name, manufactured by NOF Corporation), 58.0 g of methacrylic acid, 108 g of methyl ethyl ketone, and 2.32 g of "V-601" (trade name, manufactured by Wako Pure Chemical Ind., Ltd.) were mixed, was added dropwise at a constant rate so that the dropwise addition was completed in 2 hours. After the completion of the dropwise addition, the resultant mixture was stirred for 1 hour. Thereafter, (1) a solution containing 1.16 g of "V-601" and 6.4 g of methyl ethyl ketone was added, and then the mixture was stirred for 2 hours. Subsequently, the process of (1) was repeated 4 times, and further a solution containing 1.16 g of "V-601" and 6.4 g methyl ethyl ketone was added, and the mixture was continuously stirred for 3 hours, thereby obtaining a resin solution of methyl methacrylate/FA-513 M/PME-100/methacrylic acid (=15/70/5/10 [mass ratio]) copolymer.

The weight average molecular weight (Mw) of the obtained copolymer was 65000 (calculated in terms of polystyrene conversion by gel permeation chromatography (GPC)).

Next, 291.5 g (solid content concentration of 44.6%) of the obtained resin solution was weighed, 82.5 g of isopropanol, and 73.92 g of aqueous 1 mol/L NaOH solution were added thereto, and the inside temperature of the reactor was increased to 87° C. Subsequently, 352 g of distilled water was added dropwise at a rate of 10 ml/min to form a water dispersion. Thereafter, the inside temperature of the reactor was maintained, under an atmospheric pressure, at 87° C. for 1 hour, 91° C. for 1 hour, and then at 95° C. for 30 minutes. Thereafter, the pressure in the reactor was reduced, and isopropanol, methyl ethyl ketone, and distilled water were distilled off in the total amount of 309.4 g, thereby obtaining a water dispersion of self-dispersing polymer particles A-01 having a solid content concentration of 26.5%.

The $MFT^0$ of the obtained water dispersion of self-dispersing polymer particles A-01 and the $MFT^{25}$ of self-dispersing polymer particles A-01 were measured by the following method. The measured values are shown in Table 1.

(1) $MFT^0$ (MFT in the water dispersion): The $MFT^0$ was measured using an MFT meter manufactured by YOSHIMITU SEIKI K.K. Specifically, the obtained water dispersion was adjusted to a 25% by mass liquid. Then, the water dispersion was applied with a blade with a length of 50 cm and a width of 3 cm onto a PET film (64 cm×18 cm) so that the thickness of the coating was 300 μm. Then, the PET film was heated from the back side to apply a temperature gradient of from 12° C. to 65° C. to the coating, and the coating was dried for 4 hours under an environment at 20° C. and 22% RH. The boundary temperature [° C.] between the temperature where a white powder precipitate was produced and the temperature where a transparent film was formed was measured to be used as a minimum film-forming temperature $MFT^0$.

(2) $MFT^{25}$ (MFT in the case where 25% by mass of water-soluble organic solvent) is contained): The measurement of a minimum film-forming temperature $MFT^{25}$ was performed in the same manner as in (1) the method for measuring the MFT$^0$, except for preparing an aqueous solution of 25% by mass (solid content) of self-dispersing polymer particles A-01, 6.25% by mass of organic solvents (total amount) used for each aqueous ink shown in Table 1 (25% by mass relative to the solid content of resin particles), and 68.75% by mass of water, and using the aqueous solution in place of the water dispersion.

Synthesis Example 2

In a 2 L three necked flask having a stirrer, a thermometer, a reflux condenser tube, and a nitrogen gas introduction pipe, 360.0 g of methyl ethyl ketone was charged, and the temperature was increased to 75° C. To the flask, a solution in which 180 g of methyl methacrylate, 32.4 g methoxy ethyl acrylate, 126.0 g of benzyl methacrylate, 21.6 g of methacrylic acid, 72 g of methyl ethyl ketone, and 1.44 g of "V-601" (trade name, manufactured by Wako Pure Chemical Ind., Ltd.) were mixed, was added dropwise at a constant rate so that the addition dropwise was completed in 2 hours. After the completion of the addition dropwise, a solution containing 0.72 g of "V-601" and 36.0 g of methyl ethyl ketone was added, and the mixture was stirred at 75° C. for 2 hours. Furthermore, a solution containing 0.72 g of "V-601" and 36.0 g of methyl ethyl ketone was added, and the mixture was stirred at 75° C. for 2 hours. Thereafter, the temperature was increased to 85° C., and the stirring was continued for further 2 hours, thereby obtaining a resin solution of a methyl methacrylate/methoxy ethyl acrylate/benzyl methacrylate/methacrylic acid (=50/9/35/6 [mass ratio]) copolymer.

The weight average molecular weight (Mw) of the obtained copolymer was 66,000 (calculated in terms of polystyrene by gel permeation chromatography (GPC)).

Next, 668.3 g of the obtained resin solution was weighed, 388.3 g of isopropanol, and 145.7 ml of aqueous 1 mol/L NaOH solution were added thereto, and the inside temperature of the reactor was increased to 80° C. Next, 720.1 g of distilled water was added dropwise at a rate of 20 ml/min to form a water dispersion. Thereafter, the inside temperature of the reactor was maintained, under an atmospheric pressure, at 80° C. for 2 hours, 85° C. for 2 hours, and then at 90° C. for 2 hours. Thereafter, the pressure in the reactor was reduced, and isopropanol, methyl ethyl ketone, and distilled water were distilled off in the total amount of 913.7 g, thereby obtaining a water dispersion of self-dispersing polymer particles B-01 having a solid content concentration of 28.0%.

The MFT$^0$ of the obtained water dispersion of self-dispersing polymer particles B-01 and the MFT$^{25}$ of self-dispersing polymer particles B-01 were measured by the same method as the method for the A-01. The measured values are shown in Table 1.

Synthesis Example 3

A resin solution of a methyl methacrylate/FA-513M/PME-100/methacrylic acid (=20/62/10/8 [mass ratio]) copolymer was obtained and also a water dispersion of self-dispersing polymer particles A-02 having a solid content concentration of 28.0% were obtained in the same manner as in Synthesis Example 1, except for changing the proportion of methyl methacrylate, FA-513M, PME-100, and methacrylic acid in the synthesis of self-dispersing polymer particles A-01 of Synthesis Example 1 above. The MFT$^0$ of the water dispersion of self-dispersing polymer particles A-02 and the MFT$^{25}$ of self-dispersing polymer particles A-02 were measured by the same method as that for A-01. The measured values are shown in Table 1.

Synthesis Example 4

A resin solution of a methyl methacrylate/FA-513M/PME-100/methacrylic acid (=54/35/5/6 [mass ratio]) copolymer was obtained and also a water dispersion of self-dispersing polymer particles A-03 having a solid content concentration of 28.0% were obtained in the same manner as in Synthesis Example 1, except for changing the proportion of methyl methacrylate, FA-513M, PME-100, and methacrylic acid in the synthesis of self-dispersing polymer particles A-01 of Synthesis Example 1 above. The MFT$^0$ of the water dispersion of self-dispersing polymer particles A-03 and the MFT$^{25}$ of the self-dispersing polymer particles A-03 were measured by the same method as that for A-01. The measured values are shown in Table 1.

Synthesis Example 5

A resin solution of a methyl methacrylate/methoxyethyl acrylate/benzyl methacrylate/methacrylic acid (=39/20/35/6 [mass ratio]) copolymer was obtained and also a water dispersion of self-dispersing polymer particles B-02 having a solid content concentration of 28.0% were obtained in the same manner as in Synthesis Example 2, except for changing the proportion of methyl methacrylate, methoxyethyl acrylate, benzyl methacrylate, and methacrylic acid in the synthesis of self-dispersing polymer particles B-01 of Synthesis Example 2. The MFT$^0$ of the water dispersion of self-dispersing polymer particles B-02 and the MFT$^{25}$ of the self-dispersing polymer particles B-02 were measured by the same method as that for A-01. The measured values are shown in Table 1.

Synthesis Example 6

A resin solution of a methyl methacrylate/methoxyethyl acrylate/benzyl methacrylate/methacrylic acid (=44/15/35/6 [mass ratio]) copolymer was obtained and also a water dispersion of self-dispersing polymer particles B-03 having a solid content concentration of 28.0% were obtained in the same manner as in Synthesis Example 2, except for changing the proportion of methyl methacrylate, methoxyethyl acrylate, benzyl methacrylate, and methacrylic acid in the synthesis of the self-dispersing polymer particles B-01 of Synthesis Example 2 above. The MFT$^0$ of the water dispersion of self-dispersing polymer particles B-03 and the MFT$^{25}$ of self-dispersing polymer particles B-03 were measured by the same method as that for A-01. The measured values are shown in Table 1.

Preparation of Aqueous Ink

The dispersions of the pigment particles obtained above (cyan dispersion C, magenta dispersion M, yellow dispersion Y, and black dispersion K), the water dispersions of the self-dispersing polymer particles, and the organic solvents were used as shown in Table 1, and components were mixed so that inks respectively had the following ink composition, thereby preparing aqueous inks of four colors. Each of the obtained aqueous inks was charged in a disposable plastic syringe, and then filtered through a polyvinylidene fluoride (PVDF) filter having a pore size of 5 μm (MILLEX-SV (trade name), manufactured by Millipore Corp., 25 mm in diameter), thereby obtaining a final ink.

Composition of Cyan Ink

| | |
|---|---|
| Cyan pigment (pigment blue 15:3): | 4% by mass |
| Polymer dispersant P-1 above (solid content): | 2% by mass |
| Water dispersion (solid content) of self-dispersing polymer particles shown in Table 1: | 4% by mass |
| Organic solvent shown in Table 1: | (amount shown in Table 1) |
| OLFINE E1010 (trade name, manufactured by Nissin Chemical Industry Co., Ltd., surfactant): | 1% by mass |
| Ion exchange water: | 73% by mass |

The pH of the cyan ink was adjusted to 8.7.

Composition of Magenta Ink

The composition of the magenta ink was the same as that of the cyan ink, except for replacing the cyan pigment in the composition of the cyan ink with a magenta pigment (pigment red 122), the amount of which in the composition was the same as that of the cyan pigment. The pH of the magenta ink was adjusted to 8.7.

Composition of Yellow Ink

The composition of the yellow ink was the same as that of the cyan ink, except for replacing the cyan pigment in the composition of the cyan ink with a yellow pigment (pigment yellow 74), the amount of which in the composition was the same as that of the cyan pigment. The pH of the yellow ink was adjusted to 8.7.

Composition of Black Ink

The composition of the black ink was the same as that of the cyan ink, except for replacing the cyan pigment in the composition of the cyan ink with a black pigment (carbon black; NIPEX160-IQ (trade name), manufactured by Degussa), the amount of which in the composition was the same as that of the cyan pigment. The pH of the magenta ink was adjusted to 8.7.

The details of the solvents in the inks shown in Table 1 are as follows.

GP250: SANNIX GP250 (trade name, manufactured by Sanyo Chemical Industries, Ltd.)

GP400: SANNIX GP400 (trade name, manufactured by Sanyo Chemical Industries, Ltd.)

TPGmME: tripropylene glycol monomethyl ether (manufactured by Wako Pure Chemical Ind., Ltd.)

TEGmBE: Triethylene glycol monobutyl ether (manufactured by Wako Pure Chemical Ind., Ltd.)

<Preparation of Treatment Liquid A>

Components were mixed so as to have the following composition, thereby preparing treatment liquid A. The physical property values of treatment liquid A were as follows. The viscosity was 3.8 mPa·s, the surface tension was 37.5 mN/m, and the pH(25±1° C.) was 1.2.

| | |
|---|---|
| Malonic acid (divalent carboxylic acid, aggregating agent, manufactured by Wako Pure Chemical Ind., Ltd.): | 25.0% by mass |
| SANNIX GP250 (trade name, manufactured by Sanyo Chemical Industries, Ltd., Hydrophilic organic solvent): | 20.0% by mass |
| N-Oreoyl-N-methyltaurine sodium (surfactant): | 1.0% by mass |
| Ion exchange water: | 54.0% by mass |

<Preparation of Maintenance Liquid>

Components of the following composition were mixed and a maintenance liquid is prepared. The viscosity, surface tension, and pH (25±1° C.) of the maintenance liquid were measured and the viscosity was 2.8 mPa·s, the surface tension was 31.6 mN/m, and the pH was 8.3.

Composition of Maintenance Liquid

| | |
|---|---|
| Organic solvent shown in Table 1 | (Amount shown in Table 1) |
| Sodium oleate (manufactured by Wako Pure Chemical Ind., Ltd., surfactant) | 1% by mass |
| NaHCO$_3$ | 0.04% by mass |
| Ion exchange water | (amount to give 100% by mass in total) |

The details of the solvents in Table 1 are as follows.

| | |
|---|---|
| DEGmBE: | Diethylene glycol monobutyl ether (manufactured by Wako Pure Chemical Ind., Ltd.) |
| DPG: | Dipropylene glycol (manufactured by Wako Pure Chemical Ind., Ltd.) |
| TEG: | Triethylene glycol (manufactured by Wako Pure Chemical Ind., Ltd.) |

In the above, the measurement of the surface tension was performed at 25° C. using AUTOMATIC SURFACE TENSIOMETER CBVP-Z (trade name, manufactured by Kyowa Interface Science Co., LTD.) by the Wilhelmy method using a platinum plate. The measurement of the viscosity was performed at 30° C. using VISCOMETER TV-22 (trade name, manufactured by TOKI SANGYO CO. LTD). The measurement of pH was performed at 25° C.±1° C. using pH METER WM-50EG (trade name) manufactured by TOA ELECTRIC INDUSTRIAL CO., LTD., while using undiluted aqueous inks.

<Image Recording and Evaluation>

Images were recorded as described below by preparing TOKUBISHI ART (basis weight of 104.7 g/m$^2$) as a recording medium (coated paper), using the aqueous inks of four colors of each of the Examples and Comparative Examples and the treatment liquid A, and adjusting the supply amount of the treatment liquid A to 2.0 g/m$^2$.

Liquid Droplet Ejection Method

Recording of line images and solid images was carried out by four-color single pass recording using the aqueous inks of four colors of cyan ink, magenta ink, yellow ink, and black ink obtained in each of the Example and Comparative Examples. Here the line images were recorded by ejecting a 1 dot width line, 2 dot width line, and 4 dot width line of 1200 dp in the main scanning direction by a single pass. The solid images were recorded ejecting the aqueous inks throughout the surface of a sample obtained by cutting the recording medium into AS size. The conditions for recording are as follows.

Recording (1) Treatment Liquid Supplying Process

First, treatment liquid A was applied throughout the surface of a recording medium so that the supply amount was 2.0 g/m$^2$ by a roll coater having an application amount controlled by an anilox roller (number of lines of 100 to 300/inch).

(2) Drying and Removing Process

Subsequently, a recording medium to which treatment liquid A was applied was dried under the following conditions.

Wind velocity: 15 m/s

Temperature: The recording medium was heated with a contact-type flat heater from the side opposite to the recording surface of the recording medium (back surface) so that the surface temperature of the recording surface of the recording medium was 60° C.

Air blowing region: 450 mm (drying time of 0.7 seconds)

(3) Image Recording Process

Thereafter, the aqueous inks were ejected by ink-jet methods under the following conditions to the treatment liquid coated surface of the recording medium to which treatment liquid A was applied, thereby recording line images and solid images.

Head: A piezo full line head of 1,200 dpi/20 inch width was disposed for four colors Amount of ejected liquid droplet: recording with each of 4 values (0 µL, 2.0 µL, 3.5 µL, and 4.0 µL)

Driving frequency: 30 kHz (Conveying rate of recording medium: 635 mm/sec)

(4) Ink Drying and Removing Process

Subsequently, the recording medium to which the aqueous inks were supplied was dried under the following conditions.

Drying method: Drying by air blowing

Wind velocity: 15 m/s

Temperature: The recording medium was heated with a contact-type flat heater from the side opposite to the recording surface of the recording medium (back surface) so that the surface temperature of the recording surface of the recording medium was 60° C.

Air blowing region: 640 mm (Drying time: 1 second)

(5) Fixing Process

Next, thermally fixing treatment was carried out by passing through a pair of rollers under the following conditions.

Silicon rubber roller (Hardness of 50°, Nip width of 5 mm)

Roller temperature: 75° C.

Pressure: 0.8 MPa

<Evaluation>

The line images and solid images recorded as described above were subjected to the following evaluation. The evaluation results are shown in Table 1.

Scratch Resistance

Immediately after recording a 2 cm square (2 cm×2 cm) solid image portion on a recording medium, on the surface of the recording medium having the solid image portion, an unrecorded recording medium (the same recording medium as that used for recording (hereinafter referred to as an unused sample in this evaluation)) was disposed, a load of 200 kg/m² was applied, and rubbing was performed back and forth 10 times. Then, the transfer degree of the inks to a blank portion of the unused sample was visually observed, and then evaluated according to the following evaluation criteria.

<Evaluation Criteria>

A: No transfer of ink is observed.

B: Transfer of ink is hardly noticeable.

C: Some level of transfer of ink is observed, but in a tolerable level for practical application.

D: Transfer of ink is significant.

Blocking Resistance

A uniform image portion obtained by solid recording of the cyan ink on the solid image of the magenta ink was cut into the size of 3.5 cm×4 cm (evaluation sample 1). Then, evaluation sample 1 was disposed on an acryl sheet (10 cm×10 cm) such that the recorded surface of the evaluation sample faced up. Furthermore, a sample (evaluation sample 2) on which the solid recording of the cyan ink was performed on the solid image of the magenta ink in the same manner as in evaluation sample 1 was disposed on evaluation sample 1 such that the recorded surfaces face each other. Then, an acryl sheet (10 cm×10 cm) was further disposed thereon (on evaluation sample 2). The resultant was allowed to stand for 10 hours under the environmental conditions of 60° C. and 40% RH. After allowed to stand, a 1 kg weight was disposed on the topmost acryl sheet, and was allowed to stand for further 24 hours (equivalent to a load of 700 kg/m²). Furthermore, after storing for 2 hours under the environmental conditions of 25° C. and 50% RH, the evaluation samples 1 and 2 were separated. The ease of separation at this time and the color transfer after separating were visually observed, and evaluated in accordance with the following evaluation criteria.

<Evaluation Criteria>

A: The evaluation samples were naturally separated and the color transfer to the adjacent paper was not observed, either.

B: Adhesion occurred and the color transfer to the adjacent paper was somewhat observed.

C: Adhesion was strong and the color transfer to the adjacent paper was observed, and thus the level of practicability was low.

D: Adhesion was very strong and separation was difficult, and thus the level of practicability was extremely low.

Maintenance Performance

After the aqueous inks were ejected under the following conditions of (1) to (3), the maintenance liquid charged in the ink-jet recording device was supplied to the nozzle surface of the head by a roller. Thereafter, the nozzle surface of the ink-jet head was wiped by a wiper blade (hydrogenated NBR), and the acceptability was determined from the results of subsequent evaluation of re-ejection properties. Subsequently, maintenance performance was evaluated in accordance with the following evaluation criteria.

(1) Acceptable: Immediately after the completion of 60 minute continuous ejection, wiping with a blade is performed once. The ink ejection ratio after the wiping is 90% or more.

(2) Acceptable: Ejection was performed for 1 minute and ceased for 30 minutes, and wiping with a blade was performed once after the cessation. The ink ejection ratio rate after the wiping is 90% or more.

(3) Acceptable: Immediately after the completion of ejection for 10 minutes, wiping with a blade was performed once. No image unevenness was observed in images formed after the wiping.

Method for Measuring Ink Ejection Ratio

At the time of the start of the experiment, it was confirmed that every nozzle ejected the ink. After the completion of the experiment including the maintenance process, the number of nozzles ejecting the inks was counted. The ejection ratio was calculated as follows.

Ejection ratio(%)=[Number of nozzles ejecting inks after maintenance]/[Total number of nozzles]×100(%)

<Evaluation Criteria>

A: Acceptable in all the three items

B: Acceptable in two items

C: Acceptable only in one item

D: Unacceptable in all of the three items

TABLE 1

| | Aqueous ink | | | | Maintenance liquid | | | | Evaluation | | |
|---|---|---|---|---|---|---|---|---|---|---|---|
| | Organic solvent (% by mass) | Water dispersion (*1) | MFT⁰ | MFT²⁵ | Organic solvent (% by mass) | Surfactant | Treatment liquid pH | aggregating agent | Scratch resistance | Blocking | Maintenance performance |
| Ex. 1 | GP250(10) TPGmME(6) | A-02 | 106 | 65 | DEGmBE (25) | Sodium oleate | 8.3 | Used | A | A | A |
| Ex. 2 | GP250(10) TPGmME(6) | A-03 | 100 | 56 | DEGmBE (25) | Sodium oleate | 8.3 | Used | A | A | A |
| Ex. 3 | TPGmME(16) | A-01 | 110 | 25 | DEGmBE (25) | Sodium oleate | 8.3 | Used | A | B | B |
| Ex. 4 | GP400(10) TEGmBE(6) | A-01 | 110 | 41 | DEGmBE (25) | Sodium oleate | 8.3 | Used | A | A | A |
| Ex. 5 | GP250(10) TPGmME(6) | A-02 | 106 | 65 | DPG (25) | Sodium oleate | 8.3 | Used | A | A | B |
| Ex. 6 | GP250(10) TPGmME(6) | A-02 | 106 | 65 | TEG (15) DEGmBE (10) | Sodium oleate | 8.3 | Used | A | A | B |
| Ex. 7 | TPGmME(16) | B-01 | 75 | 20 | DEGmBE (25) | Sodium oleate | 8.3 | Used | A | B | A |
| Ex. 8 | TPGmME(16) | B-03 | 65 | 12 | DEGmBE (25) | Sodium oleate | 8.3 | Used | A | B | A |
| Ex. 9 | GP250(10) TPGmME(6) | A-02 | 106 | 65 | DEGmBE (25) | Sodium oleate | 8.3 | None | B | B | A |
| Ex. 10 | GP250(10) TPGmME(6) | A-02 | 106 | 65 | DEGmBE (25) | None | 8.3 | Used | A | A | B |
| Comp. Ex. 1 | GP250(10) TPGmME(6) | B-02 | 55 | 10 | DEGmBE (25) | Sodium oleate | 8.3 | Used | A | D | A |
| Comp. Ex. 2 | GP250(16) | A-01 | 110 | 88 | DEGmBE (25) | Sodium oleate | 8.3 | Used | D | C | D |
| Comp. Ex. 3 | GP250(10) TPGmME(6) | A-01 | 110 | 75 | DEGmBE (25) | Sodium oleate | 8.3 | Used | D | C | D |

(*1): Water dispersion = Water dispersion of self-dispersing polymer particles (resin particles)

As shown in Table 1, in the Examples, images in which the occurrence of blocking was suppressed and the scratch resistance was favorable, were obtained, and the maintenance performance was excellent.

According to the present invention, it is possible to provide an ink set and an image recording method capable of recording high quality images in a stable manner in which the occurrence of blocking in image portions is suppressed and the scratch resistance is excellent, and the cleanability of the nozzle surface of the ink-jet head or the like is excellent.

The invention includes the following exemplary embodiments, however the invention is not limited to the following exemplary embodiments.

<1> An ink set comprising:
an aqueous ink composition comprising:
water;
a pigment;
resin particles having a minimum film-forming temperature MFT⁰, which is a minimum film-forming temperature obtained when the resin particles are dispersed in water, of 60° C. or higher; and
a water-soluble organic solvent, wherein a minimum film-forming temperature MFT²⁵ of the resin particles, which is a minimum film-forming temperature obtained when the resin particles are mixed with the water-soluble organic solvent in an amount of 25% by mass relative to the solid content of the resin particles, and water, is at least 40° C. lower than MFT⁰; and
a maintenance liquid comprising an organic solvent and water.

<2> The ink set of <1>, wherein MFT²⁵ is from 40° C. to 70° C.

<3> The ink set of <1> or <2>, wherein the maintenance liquid has a pH of from 6 to 11.

<4> The ink set of any one of <1> to <3>, wherein the content of the organic solvent in the maintenance liquid is from 1 to 50% by mass relative to the total mass of the maintenance liquid.

<5> The ink set of any one of <1> to <4>, wherein 50% by mass or more of the organic solvent contained in the maintenance liquid is (alkyleneoxy)alkyl ether.

<6> The ink set of any one of <1> to <5>, wherein the pigment is a pigment coated with a polymer dispersant.

<7> The ink set of any one of <1> to <6>, wherein the resin particles are self-dispersing polymer particles.

<8> The ink set of any one of <1> to <7>, wherein the aqueous ink composition comprises at least two water-soluble organic solvents.

<9> The ink set of any one of <1> to <8>, wherein the water-soluble organic solvent contained in the aqueous ink composition comprises (alkyleneoxy)alcohol.

<10> The ink set of <9>, wherein the (alkyleneoxy)alcohol is (propyleneoxy)alcohol.

<11> The ink set of any one of <1> to <10>, wherein the water-soluble organic solvent contained in the aqueous ink composition comprises (alkyleneoxy)alkyl ether.

<12> The ink set of any one of <1> to <11>, further comprising an aqueous treatment liquid containing an aggregating component that aggregates components of the aqueous ink composition.

<13> The ink set of <12>, wherein the aggregating component is at least one selected from the group consisting of an acidic compound, a cationic polymer, and a polyvalent metal salt.

<14> The ink set of any one of <1> to <13>, wherein the maintenance liquid further comprises a surfactant.

<15> An image recording method comprising recording an image using the ink set of any one of <1> to <14>.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink set comprising:
an aqueous ink composition comprising:
water;
a pigment;
resin particles having a minimum film-forming temperature $MFT^0$, which is a minimum film-forming temperature obtained when the resin particles are dispersed in water, of 60° C. or higher; and
a water-soluble organic solvent, wherein a minimum film-forming temperature $MFT^{25}$ of the resin particles, which is a minimum film-forming temperature obtained when the resin particles are mixed with the water-soluble organic solvent in an amount of 25% by mass relative to the solid content of the resin particles, and water, is at least 40° C. lower than $MFT^0$; and
a maintenance liquid comprising an organic solvent and water,
wherein the resin particles are self-dispersing polymer particles comprising a constituent unit derived from an aromatic group-containing (meth)acrylate monomer or a constituent unit derived from an alicyclic meth(acrylate) at a content of from 10% by mass to 95% by mass based on a total mass of the self-dispersing polymer; and
wherein the water-soluble organic solvent is an (alkyleneoxy)alkyl ether.

2. An image recording method comprising recording an image using an ink set comprising:
an aqueous ink composition comprising:
water;
a pigment;
resin particles having a minimum film-forming temperature $MFT^0$, which is a minimum film-forming temperature obtained when the resin particles are dispersed in water, of 60° C. or higher; and
a water-soluble organic solvent, wherein a minimum film-forming temperature $MFT^{25}$ of the resin particles, which is a minimum film-forming temperature obtained when the resin particles are mixed with the water-soluble organic solvent in an amount of 25% by mass relative to the solid content of the resin particles, and water, is at least 40° C. lower than $MFT^0$; and
a maintenance liquid comprising an organic solvent and water,
wherein the resin particles are self-dispersing polymer particles comprising a constituent unit derived from an aromatic group-containing (meth)acrylate monomer or a constituent unit derived from an alicyclic meth(acrylate) at a content of from 10% by mass to 95% by mass based on a total mass of the self-dispersing polymer; and
wherein the water-soluble organic solvent is an (alkyleneoxy)alkyl ether.

3. The image recording method of claim 2, wherein $MFT^{25}$ is from 40° C. to 70° C.

4. The image recording method of claim 2, wherein the maintenance liquid has a pH of from 6 to 11.

5. The image recording method of claim 2, wherein the content of the organic solvent in the maintenance liquid is from 1 to 50% by mass relative to the total mass of the maintenance liquid.

6. The image recording method of claim 2, wherein 50% by mass or more of the organic solvent contained in the maintenance liquid is (alkyleneoxy)alkyl ether.

7. The image recording method of claim 2, wherein the pigment is a pigment coated with a polymer dispersant.

8. The image recording method of claim 2, wherein the aqueous ink composition comprises at least two water-soluble organic solvents.

9. The image recording method of claim 2, wherein the ink set further comprises an aqueous treatment liquid containing an aggregating component that aggregates components of the aqueous ink composition.

10. The image recording method of claim 9, wherein the aggregating component is at least one selected from the group consisting of an acidic compound, a cationic polymer, and a polyvalent metal salt.

11. The image recording method of claim 2, wherein the maintenance liquid further comprises a surfactant.

* * * * *